United States Patent
Fujita et al.

(10) Patent No.: US 8,477,200 B2
(45) Date of Patent: Jul. 2, 2013

(54) IMAGING DEVICE AND IMAGE REPRODUCTION DEVICE FOR CORRECTING IMAGES

(75) Inventors: Hideto Fujita, Yao (JP); Yukio Mori, Hirakata (JP); Haruo Hatanaka, Kyoto (JP); Makoto Yamanaka, Kobe (JP); Akihiro Maenaka, Kadoma (JP); Shigeyuki Okada, Ogaki (JP); Haruhiko Murata, Ibaraki (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 344 days.

(21) Appl. No.: 12/808,059

(22) PCT Filed: Dec. 11, 2008

(86) PCT No.: PCT/JP2008/072495
§ 371 (c)(1),
(2), (4) Date: Oct. 4, 2010

(87) PCT Pub. No.: WO2009/078327
PCT Pub. Date: Jun. 25, 2009

(65) Prior Publication Data
US 2011/0007175 A1    Jan. 13, 2011

(30) Foreign Application Priority Data
Dec. 14, 2007 (JP) .................................. 2007-323698

(51) Int. Cl.
*H04N 5/228* (2006.01)

(52) U.S. Cl.
USPC .................. 348/208.13; 348/208.1; 348/208.2

(58) Field of Classification Search
USPC .............. 348/222.1, 143, 152, 153, 155, 169, 348/220.1, 218.1, 333.01, 333.02, 333.05, 348/333.11, 208.1, 208.2, 208.3, 208.4, 208.5, 348/208.6, 208.7, 208.11, 208.13
See application file for complete search history.

(56) References Cited

U.S. PATENT DOCUMENTS 5,416,513 A   5/1995   Morisaki
(Continued)

FOREIGN PATENT DOCUMENTS

| JP | 4-245873 A | 9/1992 |
|---|---|---|
| JP | 05284411 | 10/1993 |

(Continued)

OTHER PUBLICATIONS

Extended European Search Report dated Feb. 14, 2012.
T. Celik et al.; "Enhanced Facial Feature Extraction Using Region-based Super-Resolution Aided Video Sequences"; ICIAR 2005; pp. 1141-1148.

(Continued)

*Primary Examiner* — Nicholas Giles
(74) *Attorney, Agent, or Firm* — NDQ&M Watchstone LLP

(57) ABSTRACT

An imaging device (1) includes: an imaging element (33) which outputs a signal expressing an optical image of an imaging object upon an imaging process; a particular object detection unit (14) which successively acquires a frame image based on an output signal of the imaging element and detects the position of the particular object contained in the imaging object on the frame image according to the image signal of the frame image; a cut-out unit (15) which sets in the frame image, a cut-out region smaller than the entire region of the frame image according to the detected position and extracts the image in the cut-out region as a cut-out image; and an image quality compensation unit (16) which improves the resolution of the cut-out image.

13 Claims, 12 Drawing Sheets

U.S. PATENT DOCUMENTS

| | | | | |
|---|---|---|---|---|
| 5,696,848 | A * | 12/1997 | Patti et al. | 382/254 |
| 6,034,723 | A * | 3/2000 | Fujimori | 348/207.99 |
| 6,130,949 | A | 10/2000 | Aoki et al. | |
| 6,330,344 | B1 * | 12/2001 | Kondo et al. | 382/107 |
| 6,630,950 | B1 * | 10/2003 | Ohkawara et al. | 348/208.12 |
| 6,778,768 | B2 * | 8/2004 | Ohkawara et al. | 396/55 |
| 7,015,954 | B1 * | 3/2006 | Foote et al. | 348/218.1 |
| 7,064,790 | B1 * | 6/2006 | Varma et al. | 348/441 |
| 7,085,323 | B2 * | 8/2006 | Hong | 375/240.25 |
| 7,313,278 | B2 * | 12/2007 | Echigo et al. | 382/190 |
| 7,664,293 | B2 * | 2/2010 | Ikeda | 382/107 |
| 2001/0002843 | A1 | 6/2001 | Yata | |
| 2002/0159637 | A1 * | 10/2002 | Echigo et al. | 382/190 |
| 2004/0207735 | A1 * | 10/2004 | Kameyama et al. | 348/239 |
| 2006/0017813 | A1 * | 1/2006 | Okubo et al. | 348/208.2 |
| 2007/0177027 | A1 * | 8/2007 | Nakamura et al. | 348/222.1 |
| 2009/0128646 | A1 | 5/2009 | Itoh | |

FOREIGN PATENT DOCUMENTS

| | | |
|---|---|---|
| JP | 06217188 | 8/1994 |
| JP | 10313497 | 11/1998 |
| JP | 200048211 | 2/2000 |
| JP | 200081900 | 3/2000 |
| JP | 2001169169 | 6/2001 |
| JP | 2002281506 | 9/2002 |
| JP | 2005197910 | 7/2005 |
| JP | 2005-269563 A | 9/2005 |
| JP | 2006-279894 A | 10/2006 |
| JP | 2007000205 | 1/2007 |
| JP | 2007060437 | 3/2007 |
| JP | 2007193508 | 8/2007 |
| JP | 2007-281555 A | 10/2007 |
| JP | 2007-288726 A | 11/2007 |
| JP | 2007-299339 A | 11/2007 |

OTHER PUBLICATIONS

Yasuyuki Matsushita et al.; "Full-frame Video Stabilization"; Microsoft Research Asia; 2005.

Michael T. McCormack, Charles F. Davis; "Super-Resolution for a UGS System" Textron Systems; Proceedings of SPIE vol. 5796; 2005; pp. 193-202.

Office Action mailed Feb. 14, 2012, for corresponding JP. No. 2010-063895 application.

English Abstract for JP 2007-74503 A, published Mar. 22, 2007.

English Abstract for JP 2006-279894 A, published Oct. 12, 2006.

Office Action mailed Feb. 14, 2012, for corresponding JP. No. 2010-063896 application.

English Abstract for JP 4-245873 A, published Sep. 2, 1992.

Office Action mailed Apr. 24, 2012, for corresponding JP. No. 2007-323698 application.

English Abstract for JP 2007-288726 A, published Nov. 1, 2007.

English Abstract for JP 2007-281555 A, published Oct. 25, 2007.

Final Office Action mailed May 15, 2012, for corresponding JP. No. 2010-063896 application.

English Abstract for JP 2005-269563 A, published Sep. 29, 2005.

English Abstract for JP 2007-299339 A, published Nov. 15, 2007.

Office Action in Chinese Patent Appl'n No. 200880120638.1 dated Oct. 20, 2011.

The Second Office Action issued Jul. 30, 2012 in a corresponding Chinese Application No. 200880120638.1.

Matsushita et al., Full-frame Video Stabilization, IEEE Conf. on computer vision and pattern recognition (CVPR' 05), Dec. 31, 2005, 50-57, vol. 1.

International Search Report dated Mar. 17, 2009.

Tetsuji Haga, et al; "Intruder Detection and Tracking Camera"; English translation included, Aug. 2004.

\* cited by examiner

FIG.17
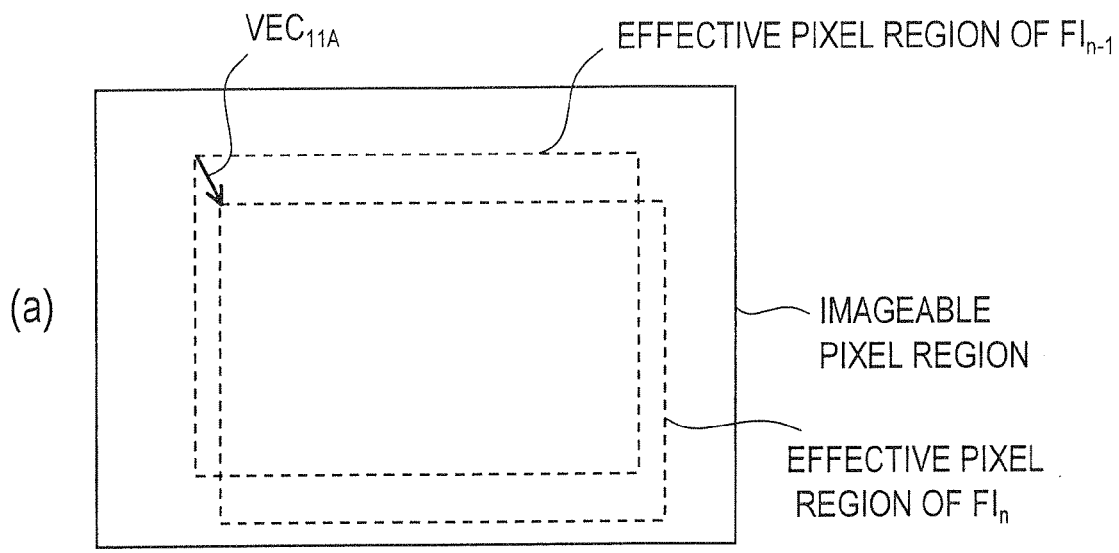
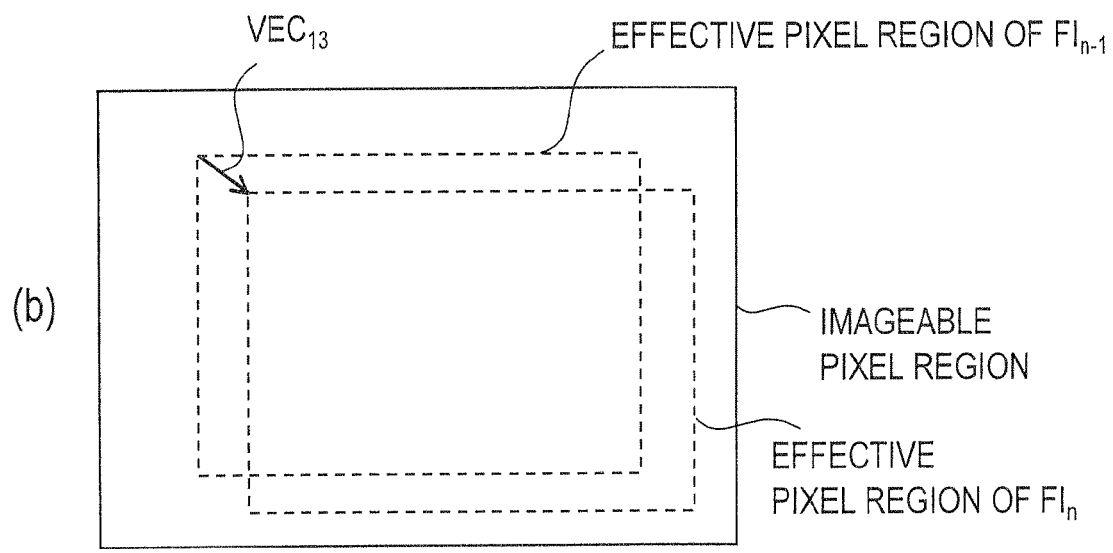

IMAGING DEVICE AND IMAGE REPRODUCTION DEVICE FOR CORRECTING IMAGES

CROSS REFERENCE TO RELATED APPLICATIONS

This application is a U.S. national stage application of International Application No. PCT/JP2008/072495, filed Dec. 11, 2008, which designates the U.S. and claims priority to Japanese Pat. App. No. JP2007-323698, filed Dec. 14, 2007, which application is incorporated herein by reference in its entirety.

TECHNICAL FIELD

The present invention relates to an imaging device that is able to take a moving image. Besides, the present invention relates to an image reproduction device that reproduces a moving image.

BACKGROUND ART

Conventionally, in taking a moving image of an object (a person and the like) of interest by using a video camera, it was necessary to adjust an image taking direction and a zoom magnification of the video camera depending on a motion of the object while confirming the object on a display screen of the video camera not to lose sight of the object. Accordingly, the image taker had to concentrate on the image taking and it was hard for the image taker to take an image communicating with the object of interest or paying attention to other things.

Non-patent document 1: Tetsuji Haga and two other persons, "Intruder Detection and Tracking Camera," [online], August, 2004, Mitsubishi Electric Corporation, [Retrieved on Dec. 14, 2007], Internet <URL: http://www.mitsubishielectric.co.jp/giho/0408/0408111.pdf>

DISCLOSURE OF THE INVENTION

Problems to be Solved by the Invention

It is apparent that convenience of a video camera increases if it is possible to obtain a moving image of an object of interest without concentrating on the image taking operation so much.

Accordingly, it is an object of the present invention to provide an imaging device that is able to obtain a moving image of an object of interest along intention of an image taker without concentrating on the image taking operation so much. Besides, it is another object of the present invention to provide an image reproduction device that is able to reproduce a moving image of an object of interest along intention of the image taker without concentrating on the image taking operation so much in an image taking time.

Means for Solving the Problem

An imaging device according to the present invention includes: an imaging element that by taking an image, outputs a signal which represents an optical image of an image taking target; a specific-object detection portion that successively obtains an input image based on an output signal from the imaging element and detects, based on an image signal of the input image, a position of a specific object contained in the image taking target on the input image; a clipped-image extraction portion that based on the detected position, sets a clip region smaller than a whole region of the input image into the input image and extracts an image in the clip region as a clipped image; and an image-quality compensation portion that improves resolution of the clipped image.

According to this, only by covering the specific object in an image taking region, it becomes possible to automatically obtain a moving image of a high-resolution clipped image of the specific object of interest. In other words, it becomes possible to obtain a moving image along intention of an image taker without concentrating on the image taking operation so much.

For example, the imaging device further includes: a device-motion detection portion that detects a motion of the imaging device; an object-motion detection portion that based on the output signal from the imaging element, detects a motion of the specific object between input images of adjacent frames; and a correction portion that corrects vibration of the clipped image based on a detection result from the device-motion detection portion and a detection result from the object-motion detection portion.

By considering not only the motion of the imaging device but also the motion of the specific object, it is possible to correct suitably the vibration of the clipped image.

More specifically, for example, the imaging device further includes an image moving portion that moves the optical image on the imaging element; wherein the correction portion, based on the detection result from the device-motion detection portion and the detection result from the object-motion detection portion, controls a movement by the image moving portion and a position of the clipped image that is set by the clipped-image extraction portion, thereby correcting the vibration of the clipped image.

And, for example, the correction portion refers to a first vector that corresponds to the motion of the imaging device which is based on the detection result from the device-motion detection portion and to a second vector that corresponds to the motion of the specific object which is based on the detection result from the object-motion detection portion; controls the image moving portion in accordance with a vector obtained by combining the first and second vectors at a predetermined ratio, while controls the clipped-image extraction portion in such a way that a position change of a still thing on an actual space, the still thing being contained in the image taking target, between clipped images of the adjacent frames is curbed.

Or, for example, the correction portion refers to a first vector that corresponds to the motion of the imaging device which is based on the detection result from the device-motion detection portion and to a second vector that corresponds to the motion of the specific object which is based on the detection result from the object-motion detection portion; controls the image moving portion based on the second vector in such a way that a position change of an image of the specific object on the imaging element is curbed, while controls the clipped-image extraction portion in such a way that a position change of a still thing on an actual space, the still thing being contained in the image taking target, between clipped images of the adjacent frames is curbed.

Besides, for example, a plurality of light receiving pixels are arranged in a first region of an image taking surface of the imaging element; a second region smaller than the first region is set in the first region of the imaging element, and the input image is formed based on an output signal from a group of light receiving pixels that are disposed in the second region; and based on the detection result from the device-motion detection portion and the detection result from the object-motion detection portion, the correction portion controls a set position of the second region and a position of the clip region that is set by the clipped-image extraction portion, thereby correcting the vibration of the clipped image.

And, for example, the correction portion refers to a first vector that corresponds to the motion of the imaging device which is based on the detection result from the device-motion detection portion and to a second vector that corresponds to the motion of the specific object which is based on the detection result from the object-motion detection portion; controls the set position of the second region in accordance with a vector obtained by combining the first and second vectors at a predetermined ratio, while controls the clipped-image extraction portion in such a way that a position change of a still thing on an actual space, the still thing being contained in the image taking target, between clipped images of the adjacent frames is curbed.

Besides, for example, the correction portion refers to a vector that depends on the motion of the specific object which is based on the detection result from the object-motion detection portion; and in a case where a magnitude of the vector is smaller than a predetermined magnitude, controls the clipped-image extraction portion in such a way that a position of the clip region is fixed between the adjacent frames.

If the position of the clip region is controlled with all motions of the specific object successively considered, a background in a moving image that includes a sequence of clipped images is likely to fluctuate; however, as described above, if the position of the clipped image is controlled, it is possible to obtain a stable moving image.

Besides, specifically, for example, by means of a super-resolution process that uses clipped images for a plurality of frames, the image-quality compensation portion improves the resolution of a clipped image of a frame of interest that is contained in the clipped images for the plurality of frames.

Besides, for example, the imaging device further includes a recording control portion that records an image signal of the clipped image before or after the improvement of the resolution into a recording portion.

Besides, for example, in the imaging device, an image signal of the clipped image whose resolution is improved is output to a display portion.

An image reproduction device according to the present invention includes: a specific-object detection portion that by reading an image signal obtained by successively taking an image of an image taking target from a recoding portion, obtains successively an input image based on the image signal, and detects, based on an image signal of the input image, a position of a specific object contained in the image taking target on the input image; a clipped-image extraction portion that based on the detected position, sets a clip region smaller than a whole region of the input image into the input image, and extracts an image in the clipped image as a clipped image; and an image-quality compensation portion that improves the resolution of the clipped image; wherein an image signal of the clipped image whose resolution is improved is output to a display portion or to outside.

ADVANTAGES OF THE INVENTION

According to the present invention, it is possible to provide an imaging device that is able to obtain an image of an object of interest along intention of an image taker without concentrating on the image taking operation so much. Besides, it is possible to provide an image reproduction device that is able to reproduce a moving image of an object of interest along intention of the image taker without concentrating on the image taking operation so much in an image taking time.

The meaning and advantages of the present invention will be more apparent from the embodiments described below. Here, the following embodiments are each an embodiment of the present invention and the present invention and the meaning of a term of each constituent component are not limited to those described in the following embodiments.

BRIEF DESCRIPTION OF THE DRAWINGS

FIGS. 17 (A) and (B) are each a diagram showing a method for setting an effective pixel region in the third embodiment of the present invention.

Figure 1:
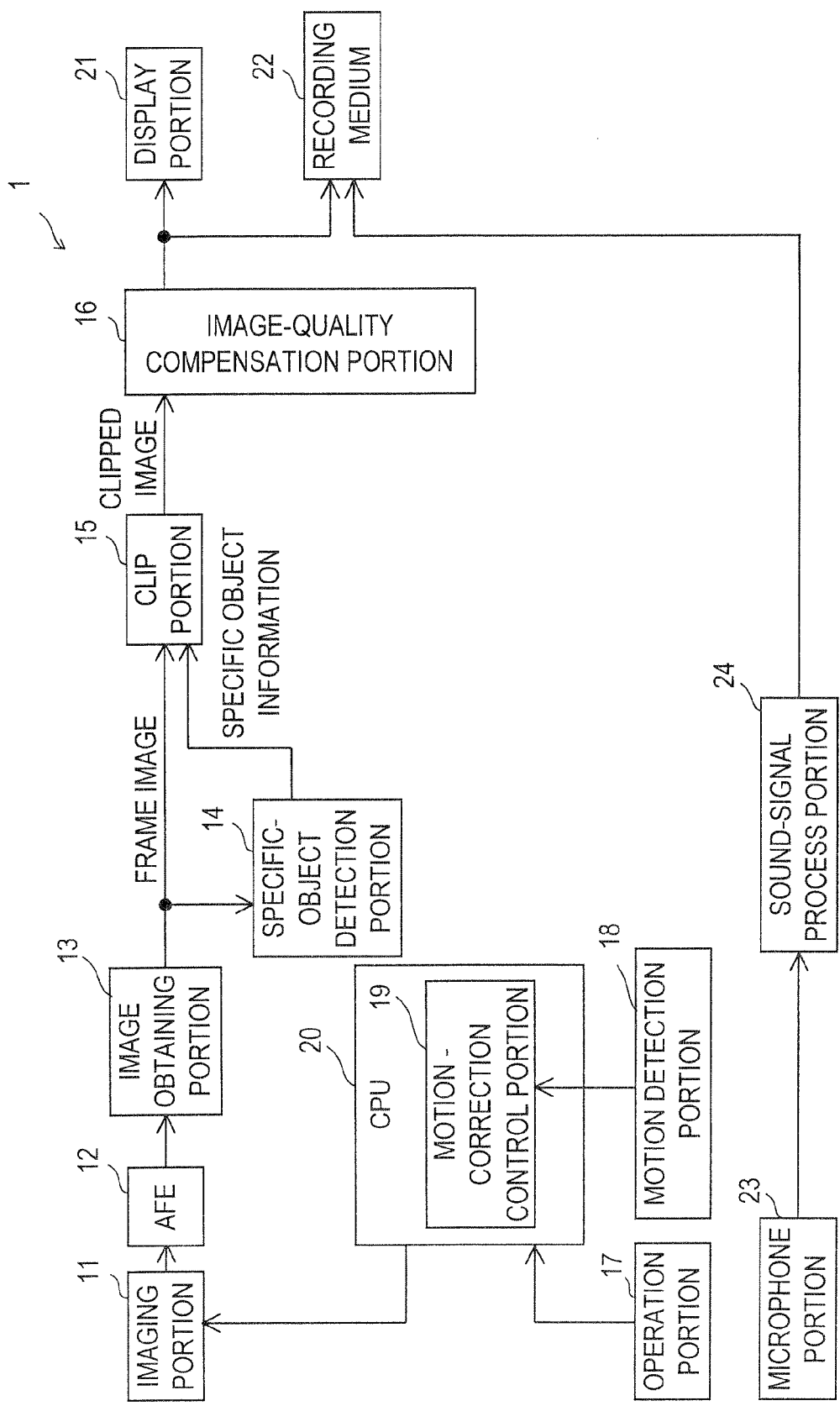
FIG. 1 is a structural block diagram of an imaging device according to a first embodiment of the present invention.

LIST OF REFERENCE SYMBOLS 1 imaging device
11 imaging portion
14 specific-object detection portion
15 clip portion
16 image-quality compensation portion
18 motion detection portion
19 motion-correction control portion
21 display portion
22 recording medium
30 zoom lens
31 focus lens
32 stop
33 imaging element
35 optical system
36 correction lens
41 hand-vibration detection portion
42 object-motion detection portion

BEST MODE FOR CARRYING OUT THE INVENTION

Hereinafter, the embodiments of the present invention are specifically described with reference to the drawings. In each referred drawing, the same portions are indicated by the same reference numbers and double description of the same portion is skipped in principle.

First Embodiment

Figure 2:
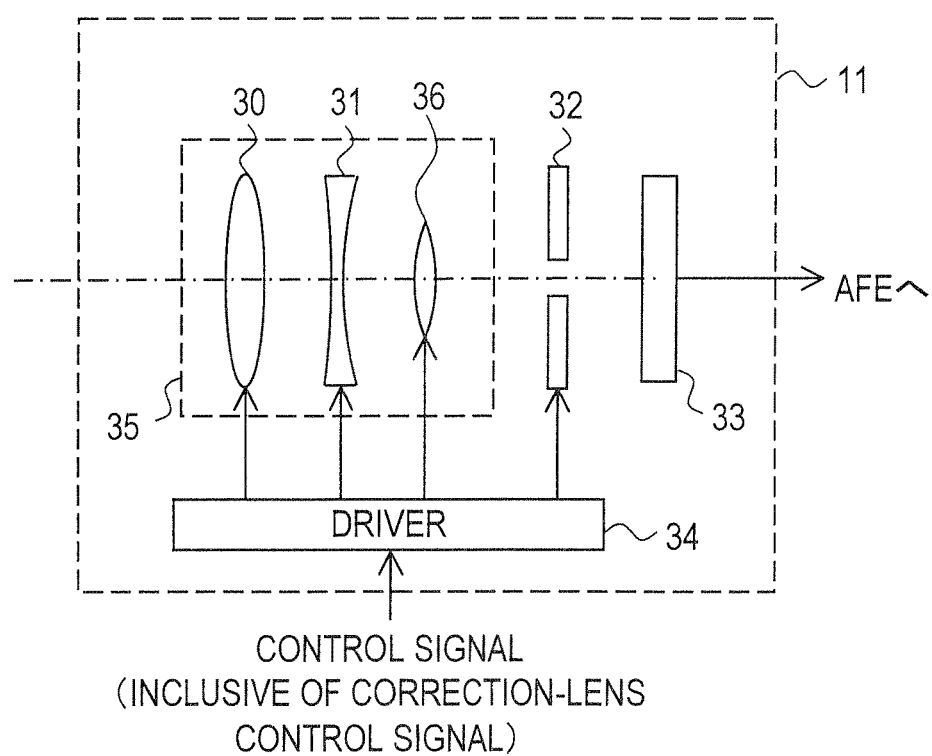
FIG. 2 is an internal structural view of the imaging device in FIG. 1.

First, a first embodiment of the present invention is described. FIG. 1 is a structural block diagram of an imaging device 1 according to the first embodiment of the present invention. The imaging device 1 is a digital video camera that is able to take and record a still image and a moving image. The imaging device 1 includes each portion indicated by reference numbers 11 to 24. FIG. 2 is an internal structural view of an imaging portion 11 in FIG. 1.

The imaging portion 11 includes: an optical system 35; a stop 32; an imaging element 33 that has a CCD (Charge Coupled Device), a CMOS (Complementary Metal Oxide Semiconductor) image sensor or the like; and a driver 34 that drive-controls the optical system 35 and the stop 32. The optical system 35 is composed of a plurality of lenses that include a zoom lens 30; a focus lens 31; and a correction lens 36. The zoom lens 30 and the focus lens 31 are able to move in an optical-axis direction. The correction lens 36 is able to move in a direction that has an angle to the optical axis. Specifically, the correction lens 36 is disposed in the optical system 35 to be able to move on a two-dimensional plane that meets with the optical axis at right angles.

Based on a control signal from a CPU (Central Processing Unit) 20 in FIG. 1, the driver 34 drive-controls each position of the zoom lens 30 and the focus lens 31 and an opening degree of the stop 32, thereby controlling the focal length (angle of view) and the focal position of the imaging portion 11 and the amount of input light into the imaging element 33. Further, based on a correction-lens control signal from a motion-correction control portion 19 present in the CPU 20, the driver 34 moves the correction lens 36 in the optical system 35. According to this movement, it is possible to achieve a well-known optical vibration correction; however, the function of the motion-correction control portion 19 and the function of a motion detection portion 18 that gives information necessary for the motion-correction control portion 19 are described later.

The imaging element 33 transduces photoelectrically an optical image that enters via the optical system 35 and the stop 32 and represents an object (image taking target); and outputs an electrical signal obtained by the photoelectric transducing to an AFE 12. More specifically, the imaging element 33 has a plurality of light receiving pixels that are arranged in a matrix shape; and in each image taking, each light receiving pixel stores signal charges of the amount of electric charges depending on a exposure period. An analog signal from each light receiving pixel that has a magnitude proportional to the amount of electric charges of the stored signal charges is successively output to the AFE 12 in accordance with a drive pulse generated in the imaging device 1. The "exposure" in the following description means the light exposure of the imaging device 33.

The AFE 12 amplifies an analog signal output from the imaging portion 11 (imaging element 33) and converts the amplified analog signal into a digital signal. The AFE 12 successively outputs this digital signal to an image obtaining portion 13. The image obtaining portion 13, based on the output signal from the AFE 12, generates an image signal that represents an image taken by the imaging portion 11. A whole image of one sheet obtained by one image taking is called a frame image. An image (inclusive of a frame image) is represented by an image signal; however, in the following description, the image signal is called image data.

A specific-object detection portion 14, based on the image data of a frame image, detects a region (in other words, a region where image data corresponding to a specific object are present) where a specific object is depicted in the frame image; and extracts a rectangular region including the region as a specific object region. Here, the shape of the specific object region may be a shape other than the rectangular shape. The size (image size) of the specific object region is smaller than that of the whole region of the frame image. The specific object is a person, for example. The specific-object detection portion 14 sends specific object information that represents the position and size of the specific object region on the frame image to a clip portion 15.

The clip portion 15, based on the specific object information, sets, in the frame image, a clip region that includes the specific object region; and clips an image in the clip region from the frame image. The cut-out image in the clip region is called a "clipped image." The clip region is smaller than the whole region of the frame image and the clipped image corresponds to a partial image of the frame image. Accordingly, the image size (the number of pixels in a horizontal direction and a vertical direction) of the clipped image is smaller than that of the frame image. For example, the clip region is set in such a way that the center of the clip region matches with the center or the center of gravity of the specific object region. Here, considering the face direction of the person as the specific object, the position of the specific object region in the clip region may be decided. For example, it is also possible to set the size of a region, in the clip region, in the side of the direction in which the face is directed larger than the size of a region opposite thereto.

The image-quality compensation portion 16 performs an image process to improve the resolution of the clipped image.

For example, the image-quality compensation portion 16 improves the resolution of the clipped image by means of a super-resolution process.

The display portion 21 is a display device that includes a liquid crystal display panel or the like. If the image data of an image to be displayed is given to the display 21, the image is displayed on a display screen of the display portion 21. For example, if the image-quality compensation portion 16 outputs the image data of a clipped image after the improvement of the resolution to the display portion 21, the clipped image after the improvement of the resolution is displayed on the display portion 21. Besides, for example, if the clip portion 15 outputs the image data of a clipped image before the improvement of the resolution to the display portion 21, the clipped image before the improvement of the resolution is displayed on the display portion 21. Or, if the whole image data of the frame image obtained by the image obtaining portion 13 are sent to the display portion 21, the whole image of the frame image is displayed on the display portion 21.

A recording medium 22 is a non-volatile memory such as a SD (Secure Digital) memory card or the like and records data given to itself. A recording control portion (not shown) disposed in the imaging device 1 controls the recording. For example, the image data of a clipped image after the improvement of the resolution is recorded into the recording medium 22. Besides, for example, the image data of a clipped image before the improvement of the resolution is recorded into the recoding medium 22. Besides, for example, the image data of the whole frame image is recorded into the recording medium 22. It is also possible to record the image data of a clipped image before or after the improvement of the resolution together with the whole image data of the frame image into the recording medium 22. Here, it is possible to specify what type of image data to record into the recording medium 22 by an operation on an operation portion 17. Besides, in recording the image data, the image data is compressed by a predetermined type of compression and recorded. However, the image data may be recorded without performing the compression (sa-called RAW data may be recorded).

The operation portion 17 is a portion that accepts an operation from a user, and contents of an operation on the operation portion 17 are transmitted to the CPU 20. The CPU 20 controls integrally the operation inside the imaging device 1.

A microphone portion 23 transduces a sound near the imaging device 1 into an electrical signal and outputs the electrical signal. A sound-signal process portion 24 applies a necessary sound signal process to the output signal from the microphone portion 23 to generate a sound signal that represents the sound input into the microphone portion 23. If necessary, this sound signal is compressed by a predetermined type of compression and recorded into the recording medium 22.

The operation mode of the imaging device 1 includes: an image taking mode that makes it possible to take and record a still image or a moving image; and a reproduction mode in which a still image or a moving image recorded in the recording medium 22 is reproduced and displayed on the display portion 21. In response to an operation on the operation portion 17, a changeover between the modes is performed. In the image taking mode, the imaging portion 11 successively takes an image at a predetermined frame period (e.g., 1/30 sec.), so that one sheet of frame image is obtained at each frame period.

[Operation in Image Taking Time]

Figure 3:
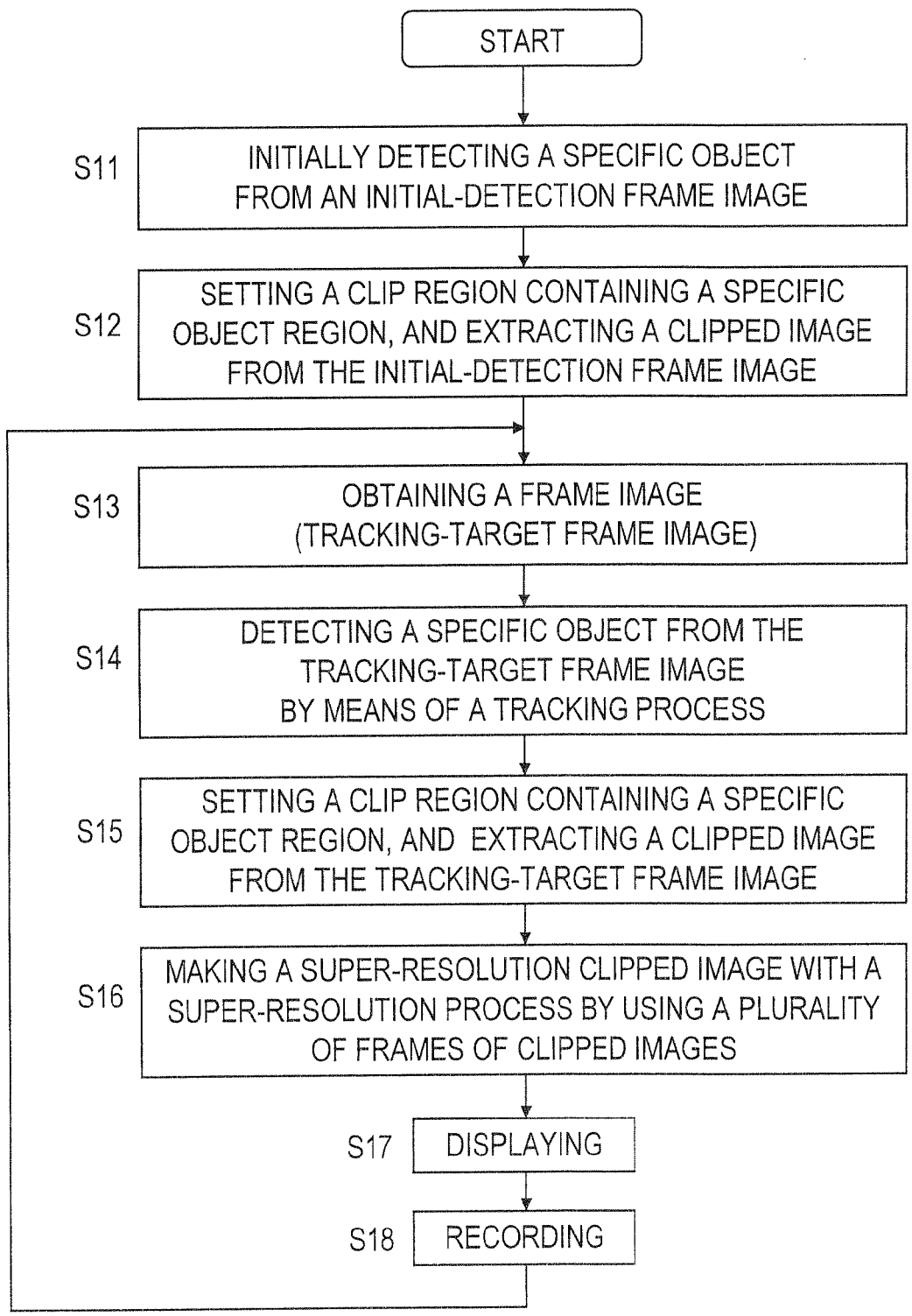
FIG. 3 is a flow chart showing an operation flow of the imaging device in FIG. 1 in a time of taking a moving image.

Basic operation of the imaging device 1 at a time a command for taking and recording a moving image is given to the operation portion 17 is described. FIG. 3 is a flow chart showing a flow of the basic operation.

First, in a step S11, the specific-object detection portion 14 detects a specific object from a frame image that is obtained after a command for taking and recording a moving image is given. The detection in the step S11 is called an initial detection. A frame image to which the initial detection is to be applied is especially called an initial-detection frame image.

If the initial detection of the specific object is completed, the specific-object detection portion 14 sets a specific object region that contains a depiction region of the specific object detected in the step S11; and sends specific object information that represents the position and size of the specific object region to the clip portion 15. In a step S12, the clip portion 15, based on the specific object information, sets a clip region containing the specific object region in the initial-detection frame image; and extracts an image in the clip region from the initial-detection frame image as a clipped image.

Figure 4:
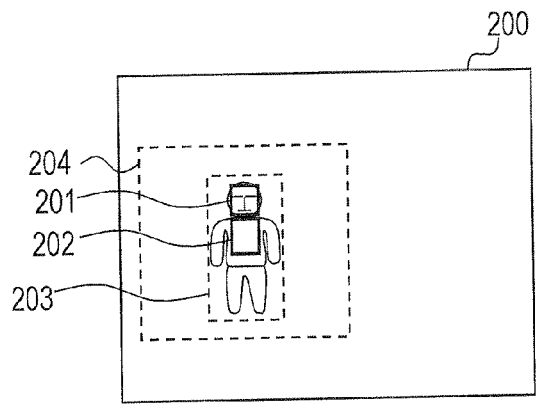
FIG. 4 is a diagram showing a frame image from which a specific object is to be detected.

Now, it is supposed that the specific object is a person; operations in the steps S11 and S12 in this case are described. The specific-object detection portion 14, first, detects and extracts a face region, which is a region containing the face portion of the person, from the initial-detection frame image. FIG. 4 shows a face region 201 that is extracted from a frame image 200 as an example of the initial-detection frame image. Next, a body region 202 that is a region containing a body portion of the person is detected. The body region 202 is a rectangular region that is present adjacently to the face region 201 on a down side (on a side in a direction from the middle of brows to the mouth) from the face region 201. The size of the body region 202 is decided depending on the size of the face region 201. Thereafter, the rectangular region that contains the face region 201 and the body region 202 is extracted as the specific object region from the frame image 200. The inside of a region indicated by a broken line 203 in FIG. 4 corresponds to the specific object region. Considering the position and size of the face region 201 and the like, it is desirable to set the specific object region in such a way that the whole body of the person corresponding to the face region 201 is contained in the specific object region. Besides, the inside of a region indicated by a broken line 204 is the clip region that is set in the frame image 200.

Here, various techniques are known as techniques to detect a face contained in an image; the specific-object detection portion 14 is able to employ any technique. Typically, for example, an image in a region of interest that is set in a frame image and a reference face image having a predetermined image size are compared with each other to determine a similarity degree between the both images; and it is detected whether or not a face is contained in the region of interest (whether or not the region of interest is a face region) based on the similarity degree. In the frame image, the region of interest is shifted in a left-right direction or an up-down direction by one pixel after another. And, the image in the region of interest after the shift and the reference face image are compared with each other to determine again the similarity degree between the both images and the same detection is performed. As described above, the region of interest is updated and set by being shifted, for example, from a left upper portion to a right lower portion in the frame image by one pixel after another. Besides, the frame image is reduced at a predetermined percentage and the same face detection process is applied to the image after the reduction. By repeating such processes, it is possible to detect an arbitrary-size face from the frame image.

After the process in the step S12, the process goes to a step S13. In the step S13, a frame image at the current time is obtained, then the process goes to a step S14. In the step S14, the specific-object detection portion 14 detects the specific object from the frame image obtained in the step S13 by means of a tracking process based on the image data. A frame image from which an specific object is to be detected by the tracking process is especially called a tracking-target frame image. As a method for a tracking process of a specific object based on image data, it is possible to employ a well-known arbitrary method.

For example, the tracking process is performed based on color information that represents a color of a specific object. As a method for a tracking process based on color information, it is possible to use methods described in JP-A-1993-284411, JP-A-2000-48211, JP-A-2001-169169 and the like. For example, in a case where the frame image 200 shown in FIG. 4 is an initial-detection frame image, the specific-object detection portion 14 identifies the color of the body region 202 based on a color signal (a color-difference signal or an RGB signal) in the body region 202. Thereafter, based on the color signal of the tracking-target frame image, a region that has a color having high similarity with the color of the body region 202 is extracted from the tracking-target frame image. The region extracted here is the body region of the specific object in the tracking-target frame image and the rectangular region containing the body region is set as the specific object region in the tracking-target frame image. Here, considering the position and size of the body region and the like, it is desirable to set the specific object region in such a way that the whole body of the person as the specific object is contained in the specific object region.

Specific object information that represents the position and size of the specific object region which is set in the step S14 is sent to the clip portion 15. In a step S15, the clip portion 15, based on the specific object information, sets a clip region that contains the specific object region in the tracking-target frame image; and extracts an image in the clip region as a clipped image from the tracking-target frame image. In other words, the clip region is set to track the specific object. Basically, for example, the position of the clip region is set in such a way that the specific object is always situated at the center of a clipped image in a moving image that consists of a sequence of clipped images. A sequence of clipped images means a plurality of clipped images arranged in time series that are obtained from a plurality of frame images arranged in time series. Likewise, a plurality of frame images arranged in time series are also called a sequence of frame images.

In the next step S16, the image-quality compensation portion 16 performs a high-resolution process to improve the resolution of the clipped image. For example, the image size of each of frame images that contain the initial-detection frame image and the tracking-target frame image is 1920×1080 (in other words, the number of pixels in the horizontal direction is 1920 and the number of pixels in the vertical direction is 1080), while the image size of each clipped image before the improvement of the resolution by the high-resolution process is 960×540. And, the image size of each clipped image is changed to 1920×1080 by the high-resolution process. It is supposed that the size of the clip region, that is, the image size of the clipped image before the improvement of the resolution is always constant. However, it is also possible to change the image size within a moving image.

In the present example, as the high-resolution process, the super-resolution process is employed. In the super-resolution process, a plurality of low-resolution images that have a position displacement are referred to; and based on the amount of position displacement among the plurality of low-resolution images and the image data of the plurality of low-resolution images, the resolution of the low-resolution image is increased, so that one sheet of high-resolution image is generated. The image-quality compensation portion 16 is able to use a well-known arbitrary super-resolution process. For example, it is possible to use the super-resolution process methods described in JP-A-2005-197910, JP-A-2007-205, JP-A-2007-193508 and the like.

Figure 5:
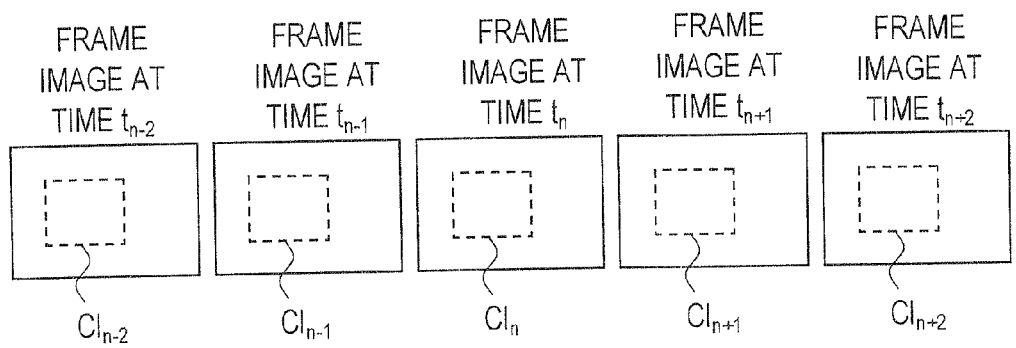
FIG. 5 is a diagram showing a sequence of frame images that are arranged in time series and a sequence of clipped images that are extracted from the sequence of frame images.

For example, in a case where the super-resolution process is performed by using clipped images of three frames, the process is performed as follows. Now, it is supposed that times $t_{n-2}$, $t_{n-1}$, $t_n$, $t_{n+1}$, $t_{n+2}$, ... come in order every time a time for one frame period elapses; and as shown in FIG. 5, a frame image obtained at the time $t_{n+i}$ is called a frame image at the time $t_{n+i}$ (i is an integer). And, a clipped image clipped from the frame image at the time $t_{n+i}$ is indicated by $CI_{n+i}$. In this case, one sheet of high-resolution image is generated by using three clipped images $CI_{n+i}$, $CI_{n+i+1}$, and $CI_{n+i+2}$.

A specific example in which i is (−2) is described. At the time point the clipped image $CI_n$ is obtained, the three clipped images $CI_{n-2}$, $CI_{n-1}$, and $CI_n$ are referred to; and the super-resolution process is performed by using the clipped images $CI_{n-2}$, $CI_{n-1}$, and $CI_n$ as first, second and third observation low-resolution images, respectively. By using the first observation low-resolution image as a reference, the amount of position displacement between the first and second observation low-resolution images and the amount of position displacement between the first and third observation low-resolution images are detected. The amount of position displacement is a two-dimensional amount that contains a horizontal component and a vertical component, and is also called a motion amount or a motion vector. The amount of position displacement is detected to have a resolution of sub-pixel by using the representative point matching method, the block matching method, the Gradient Method or the like. In other words, the amount of position displacement is detected by using a distance shorter than the interval between adjacent pixels in the observation low-resolution image as the smallest detection unit.

On the other hand, by using the linear interpolation or the bi-cubic interpolation, an image that has the number of pixels obtained by increasing the number of pixels of the first observation low-resolution image in the horizontal and vertical directions is generated as an initial high-resolution image. Thereafter, by using each of the above detected amounts of position displacement, three low-resolution images that constitute the current high-resolution image are estimated; and the high-resolution image is updated in such a way that an error between each of the estimated low-resolution images and each observation low-resolution image is minimized. The high-resolution image obtained finally corresponds to the clipped image $CI_{n-2}$ after the improvement of the resolution. The resolutions of the other clipped images are improved in the same way. For example, the improvement of the resolution of the clipped image $CI_{n-1}$ is achieved by using the clipped images $CI_{n-1}$, and $CI_n$ and $CI_{n+1}$.

Figure 6:
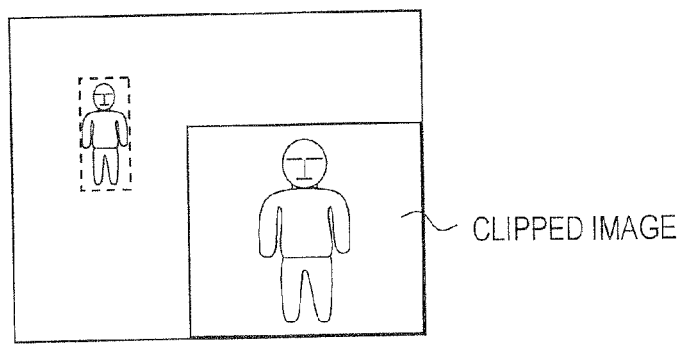
FIG. 6 is a diagram showing a display screen example of a display portion in FIG. 1 in which a clipped image is superposed on a frame image.

The clipped image after the improvement of the resolution is displayed on the display portion 21 in a step S17 following the step S16. At this time, it is possible to display the clipped image after the improvement of the resolution and the whole image of the frame image that is the original of the clipped image side by side on the display screen of the display portion 21 at the same time, while as shown in FIG. 6, it is also possible to display the clipped image after the improvement of the resolution with the clipped image after the improvement of the resolution superposed on part of the frame image.

Further, in a step S18 following the step S17, the image data of the clipped image after the improvement of the resolution is recorded into the recording medium 22. At this time, the whole image data of the frame image may be recorded into the recoding medium 22 together with the image data of the clipped image after the improvement of the resolution. Here, it is also possible to record the image data of the clipped image before the improvement of the resolution into the recording medium 22.

After the display and recording process in the steps S17 and S18, back to the step S13, until a command for ending the taking and recording of a moving image is performed on the operation portion 17, each process in the above steps S13 to S18 is performed repeatedly. As a result, a moving image that consists of a sequence of clipped images containing the specific object is recorded into the recording medium 22. Here, together with the image data of this moving image, the sound data (sound signal) obtained by the sound-signal process portion 24 is also recorded into the recording medium 22.

If an arbitrary reproduction device reads the image data from the recoding medium 22 that are obtained through the processes in the steps S11 to S18, it is possible to reproduce and display the moving image of the clipped image having a good composition for the specific object on the reproduction device (of course, it is possible to reproduce the sound data). Especially, if the image data of the clipped image after the improvement of the resolution are read, it is possible to reproduce and display a moving image of a high-definition clipped image.

In taking a moving image of an object of interest by using an imaging device, conventionally, it was necessary to adjust an image taking direction and a zoom magnification of the imaging device depending on a motion of the object while confirming the object on a display screen of the imaging device not to lose sight of the object. Accordingly, the image taker had to concentrate on the image taking and it was hard for the image taker to take an image communicating with the object of interest or paying attention to other things.

According to the present embodiment, it is possible to obtain a moving image having a good composition for an object of interest along intention of an image taker without concentrating on the confirmation of the object on the display screen and on the operations for the image taking direction and zoom magnification so much. Accordingly, it also becomes possible to take an image communicating with the object of interest or paying attention to other things.

Here, in the above description, it is supposed that only one person is contained in the image taking region of the imaging device 1; however, in a case where a plurality of persons are contained in the image taking region, one of the plurality of persons is selected as the specific object. For example, the face region of each person is extracted from the initial-detection frame image; the initial-detection frame image that clearly represents the face regions is displayed on the display screen of the display portion 21; and one person to be selected as the specific object is selected by the user. This selection is performed by operating the operation portion 17. Or, the display portion 21 is made to function as a so-called touch panel, and the selection may be performed by operating the touch panel. Further, or, the face image of the person to be selected as the specific object may be registered in the imaging device 1 in advance. In this case, the imaging device 1 checks automatically whether or not the registered face is contained in the initial-detection frame image; if it is determined that the registered face is contained in the initial-detection frame image, the person who has the registered face is selected as the specific object.

Besides, in the case where a plurality of persons are contained in the image taking region, each of the plurality of persons is regarded as a specific object; and a plurality of specific object regions that contain the specific objects may be set. For example, in a case two persons are contained in the image taking region, each of the persons is regarded as a specific object; and a specific object region that contain a depiction region of one person and a specific object region that contains a depiction region of the other person are set separately. Then, a clip region is set for each specific object region; two clipped images are extracted from one frame image; and the image data of each clipped image may be separately recorded into the recording medium 22. The clipped images recorded here are clipped images after the improvement of the resolution. However, it is also possible to record clipped images before the improvement of the resolution. In a reproduction time, for example, one of the above two persons is selected by the user; and the moving image of the clipped image of the selected person is reproduced and displayed.

Besides, in the above example, the image size of the clipped image before the improvement of the resolution, that is, the size of the clip region is constant; however, it is possible to make the size variable. For example, in the step S15, it is also possible to set the size of the clip region in such a way that the change in the ratio of the size of the specific object in the clip region to the size of the clip region is curbed in the moving image of the clipped image. Extremely, it is also possible to set the size of the clip region in such a way that the ratio becomes always constant. If so, even if the on-the-actual-space distance between the imaging device 1 and the specific object changes, the size of the specific object becomes constant in the moving image of the clipped image. On the other hand, in a case where the color of the body region of the specific object that is a tracking target is similar to the color of the background other than the specific object, the above ratio may be reduced considering that the possibility of failing in tracking becomes relatively high.

Besides, the sound signal of a sound released from the specific object may be emphasized and recorded into the recoding medium 22. To achieve this, specifically, for example, the microphone portion 23 in FIG. 1 is composed of a plurality of microphones that are disposed at positions different from each other on a housing of the imaging device 1. The plurality of microphones are two non-directional microphones, for example. And, the sound-signal process portion 24 is composed in such a way that it is possible to perform a stereo process that generates two channel signals (stereo signals), which have a directional axis, from output signals from the two non-directional microphones. Because the technique for the stereo process is well known, detailed description is skipped. And, by performing the stereo process in such a way that a sound coming from the presence position of the specific object on the actual space is emphasized, a sound signal in which the sound released from the specific object is emphasized is generated; and the sound signal may be recorded into the recording medium 22 together with the image data of the clipped image.

Besides, further, if data that represent characteristics of the sound released from the specific object are recorded in the imaging device 1 in advance, by using publicly known sound-source separation technologies (e.g., technologies described in JP-A-1998-313497, JP-A-2000-81900), it is also possible to separate the sound released by the specific object from a sound released by another sound source. And, the sound signal of the separated sound that is released from the specific object may be recorded into the recoding medium 22 together with the image data of the clipped image.

[Operation in Reproduction Time]

Figure 7:
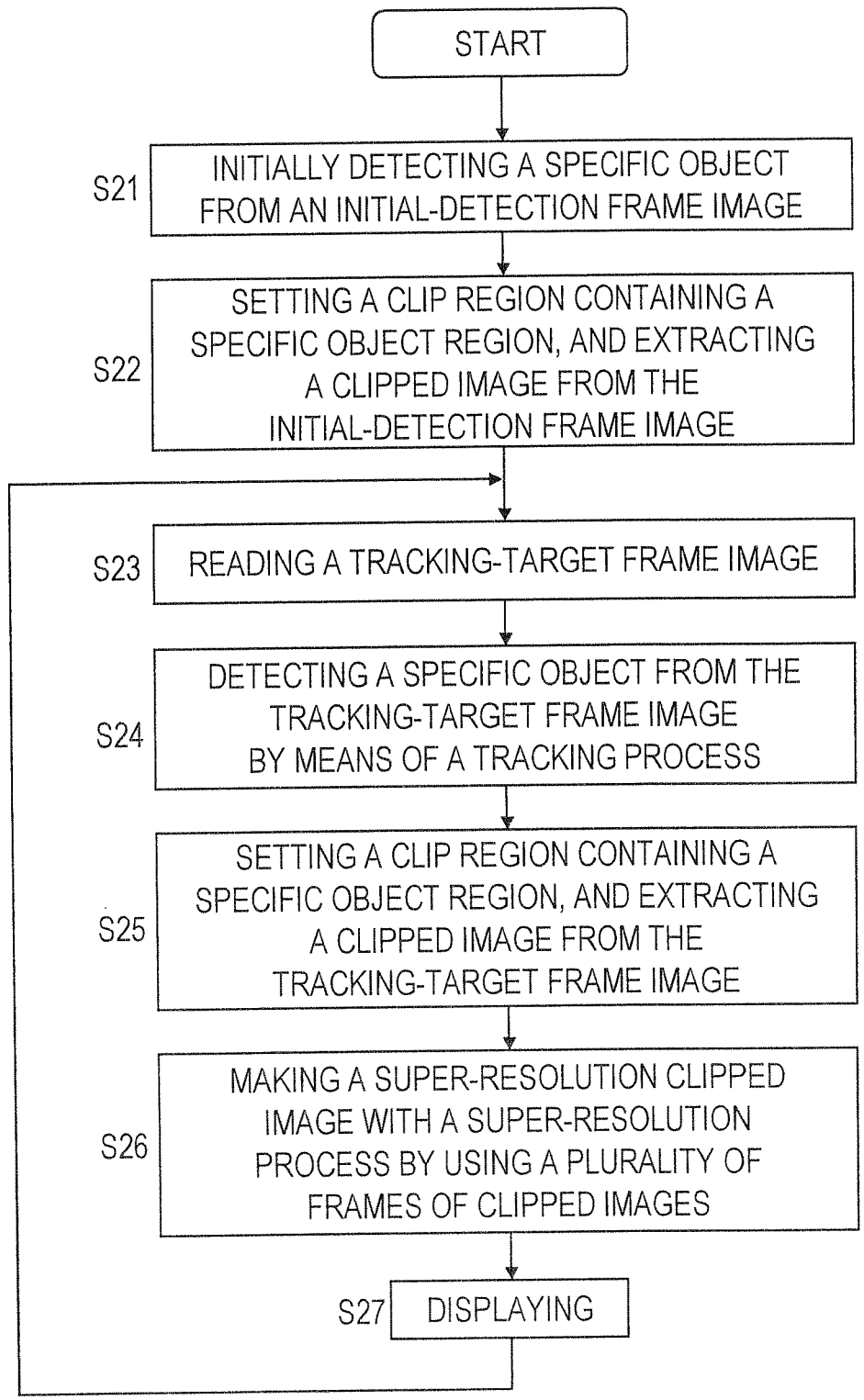
FIG. 7 is a flow chart showing an operation flow of the imaging device in FIG. 1 in a time of reproducing a moving image.

The operation, in which the detection process of the specific object, the clip process and the high-resolution process are performed in an image taking time, is described; however, these processes may be performed in a reproduction time. Operation of the imaging device 1 in a reproduction time in this case is described with reference to FIG. 7. FIG. 7 is a flow chart showing an operation flow of the imaging device 1 in a reproduction time. It is supposed that the whole image data of a sequence of frame images that are obtained in a time of taking a moving image and arranged in time series are recorded in the recording medium 22 before an operation of the reproduction. In a reproduction time, the image obtaining portion 13 is made to read successively frame images in a time-series order from the recording medium 22; the image data of the frame images are given to the specific-object detection portion 14 and the clip portion 15, so that the processes in the steps S21 to S27 of FIG. 7 are performed. The processes in the steps S21 to S27 are substantially the same as those in the steps S11 to S17 in FIG. 3, respectively.

Specifically, the specific-object detection portion 14 detects the specific object from the frame mages that are successively given from the recoding medium 22 via the image obtaining portion 13. The first detection of the specific object in the step S21 is called an initial detection; and a frame image from which the specific object is to be detected for the first time is called an initial-detection frame image.

If the initial detection of the specific object is completed, the specific-object detection portion 14 sets a specific object region that contains a depiction region of the specific object detected in the step S21; and sends specific object information that represents the position and size of the specific object region to the clip portion 15. In a step S22, the clip portion 15, based on the specific object information, sets a clip region that contains the specific object region in the initial-detection frame image; and extracts an image in the clip region from the initial-detection frame image as a clipped image.

The frame image that is read from the recording medium 22 after the initial-detection frame image is processed as a tracking-target frame image. In a step S23 following the step S22, one sheet of tracking-target frame image is read; in the next step S24, by means of the same tracking process as that in the step S14, the specific-object detection portion 14 detects the specific object from the tracking-target frame image that is read in the step S23 and sets a specific object region.

The specific object information that represents the position and size of the specific object region that is set in the step S24 is sent to the clip portion 15. In a step S25, the clip portion 15, based on the specific object information, sets a clip region containing the specific object region in the tracking-target frame image; and extracts an image in the clip region from the tracking-target frame image as a clipped image.

In the next step S26, the image-quality compensation portion 16 performs the same high-resolution process as that in the step S16 in FIG. 3 to improve the resolution of the clipped image. The clipped image after the improvement of the resolution is displayed on the display portion 21 in a step S27. At this time, as described above, it is also possible to display the clipped image after the improvement of the resolution and the whole image of the frame image that is the original of the clipped image side by side on the display screen of the display portion 21 at the same time, while as shown in FIG. 6, it is also possible to display the clipped image after the improvement of the resolution with the clipped image after the improvement of the resolution superposed on part of the frame image. The image data of the clipped image after the improvement of the resolution that is generated in the reproduction time may be recorded into the recording medium 22. Here, it is also possible to skip the high-resolution process in the step S26 and display the clipped image before the improvement of the resolution on the display portion 21.

After the display process in the step S27, back to the step S23, as long as the tracking-target frame image to be read from the recording medium 22 is present, each process in the above steps S23 to S27 is performed repeatedly. Here, also, the sound signal that is recorded into the recording medium 22 at the same time the clipped image is displayed is reproduced; and the sound corresponding to the sound signal is output from a speaker (not shown) disposed in the imaging device 1.

By enabling such a reproduction process, it is possible to reproduce a moving image having a good composition for an object of interest along intention of an image taker without, in an image taking time, concentrating on the confirmation of the object on the display screen and on the operations for the image taking direction and zoom magnification so much. Accordingly, it also becomes possible to take an image communicating with the object of interest or paying attention to other things.

Use examples and usefulness of the imaging device 1 are additionally described. The image taker takes an image with an angle of view as wide as possible to cover the object of interest (in other words, the specific object) in the image taking region. If so, the object covered in the wide angle of view (image taking region) is automatically recognized and tracked, so that the clipped image containing the object is successively generated. Accordingly, by only facing the imaging device 1 toward the object of interest, the image taker is able to take an image of the object which the image taker desires without considering anything. And, in a reproduction time, it is possible to view an image in which the object of interest is clipped with a suitable composition.

Besides, in achieving the reproduction operation in FIG. 7, the imaging device 1 functions as an image reproduction device. The user takes an image with an angle of view as wide as possible in such a way that the object of interest is covered in the image taking region; by only giving a moving image (moving image that consists of a sequence of frame images) obtained by the image taking to the image reproduction device and selecting the object which the user desires to view, the user is able to view an image in which the object is clipped with a suitable composition. Accordingly, if there is such an image reproduction device, the image taker does not need to concentrate on the image taking so much.

Here, in the above example, the image is reproduced and displayed on the display device 21 that is disposed on the imaging device 1; however, by supplying the image data of an image desired to be displayed to an external display device (not shown) outside the imaging device 1, the clipped image and the like before or after the improvement of the resolution may be displayed on the external display device. Besides, the image data of the clipped image before or after the improvement of the resolution may be supplied to an external device (server device that operates a web site and the like) that uses the image data via a network and the like if necessary.

Besides, in the above example, as the process to improve the resolution of the clipped image, the super-resolution process is used; however, as the process, it is also possible to use a process other than the super-resolution process. For example, by magnifying the image size of the clipped image output from the clip portion 15 with so-called digital zooming, the resolution of the clipped image may be improved. In this case, for example, if the image size of the frame image is 1920×1080 and the image size of the clipped image before the improvement of the resolution is 960×540, by magnifying the image size of the clipped image before the improvement of the resolution by two times in the horizontal direction and the vertical direction, respectively, a clipped image (in other words, clipped image after the improvement of the resolution) that has the image size of 1920×1080 is generated. The magnification of the image size is achieved by a resolution transform that uses the interpolation process. As techniques for the interpolation process, it is possible to use various techniques such as the nearest neighbor method, the bilinear method, the bi-cubic method and the like.

Besides, further, by applying a sharpening process to the clipped image (hereinafter, called a before-sharpening image) after the improvement of the resolution that is obtained via the above interpolation process, the image after the sharpening process (hereinafter, called an after-sharpening image) may be used as the final clipped image after the improvement of the resolution to be output from the image-quality compensation portion 16. For example, by applying filtering that uses an edge enhancement filter (differential filter or the like) or an unsharp mask filter to the before-sharpening image, it is possible to generate the after-sharpening image. The filtering that uses an unsharp mask filter is also called unsharp masking. In the unsharp masking, the before-sharpening image is smoothed to generate a smoothed image; then, a difference image between the smoothed image and the before-sharpening image is generated. And, by combining the difference image and the before-sharpening image to sum up each pixel value of the difference image and each pixel value of the before-sharpening image, the after-sharpening image is generated.

The resolution improvement process for the clipped image that uses the super-resolution process is performed based on clipped images of a plurality of frames that contains the clipped image (see the step S16 and the like in FIG. 3); however, in a case where the above before-sharpening image or the after-sharpening image is used as a clipped image after the improvement of the resolution to be output from the image-quality compensation portion 16, to improve the resolution of one sheet of clipped image, it is not necessary to refer to the clipped images of the plurality of frames. In other words, it is possible to improve the resolution of the clipped image based on only one sheet of clipped image of interest.

[Vibration Correction Operation]

Next, the motion detection portion 18 and the motion-correction control portion 19 in FIG. 1 are described. The motion detection portion 18 includes two angular speed sensors and detects so-called hand vibration that acts on the imaging device 1. One angular speed sensor measures an angular speed in a yaw direction (horizontal direction) of the imaging device 1 at a predetermined sampling period; and outputs a signal that represents the angular speed in the yaw direction of the imaging device 1 at each sampling period, while the other angular speed sensor measures an angular speed in a pitch direction (vertical direction) of the imaging device 1 at a predetermined sampling period; and outputs a signal that represents the angular speed in the pitch direction of the imaging device 1 at each sampling period.

The yaw direction and the pitch direction meet with each other at right angles and also meet with the optical axis at right angles. Now, it is supposed that the optical axis is parallel to a horizontal plane. If a vibration in the yaw direction is given to the imaging device 1, the optical axis of the imaging device 1 rotates on a plane parallel to the horizontal plane; if a vibration in the pitch direction is given to the imaging device 1, the optical axis of the imaging device 1 rotates on a plane parallel to the plumb plane.

The motion detection portion 18 detects a motion of the imaging device 1 (in other words, motions of the imaging device 1 in the yaw direction and the pitch direction) based on an output signal from each angular speed sensor; and sends hand vibration information that represents the detected motion of the imaging device 1 to the motion-correction control portion 19. The motion-correction control portion 19, based on the hand vibration information, generates a correction-lens control signal and drive-controls the position of the correction lens 36 via the driver 34 (see FIG. 2). If the position of the correction lens 36 is fixed, an image formed on the imaging element 33 is moved on the imaging element 33 in a left-right direction (horizontal direction of the imaging element 33) by a hand vibration in the yaw direction, while the image formed on the imaging element 33 is moved on the imaging element 33 in an up-down direction (vertical direction of the imaging element 33) by a hand vibration in the pitch direction.

Most basically, the position of the correction lens 36 is drive-controlled based on the hand vibration information in such a way that the movement of an image on the imaging element 33 due to hand vibration does not occur. This is generally called an optical hand vibration correction. By this optical hand vibration correction, the vibration of the frame image due to the motion of the imaging device 1 is curbed. Here, for simple description, only the yaw direction and the pitch direction are of interest; however, further, by disposing an angular speed sensor that measures an angular speed in a roll direction of the imaging device 1, hand vibration in the roll direction may be corrected.

Second Embodiment

Although it is also possible to perform a general optical hand vibration correction in the imaging device 1, another embodiment that uses the hand vibration information is described as a second embodiment. The second embodiment corresponds to an embodiment obtained by modifying part of the first embodiment. The technology described in the second embodiment is combined with the first embodiment and put into practice; and the items described in the first embodiment are also applied to the second embodiment as long as there is no discrepancy. A structural block diagram of an imaging device according to the second embodiment is the same as that of the imaging device 1 in FIG. 1.

Figure 8:
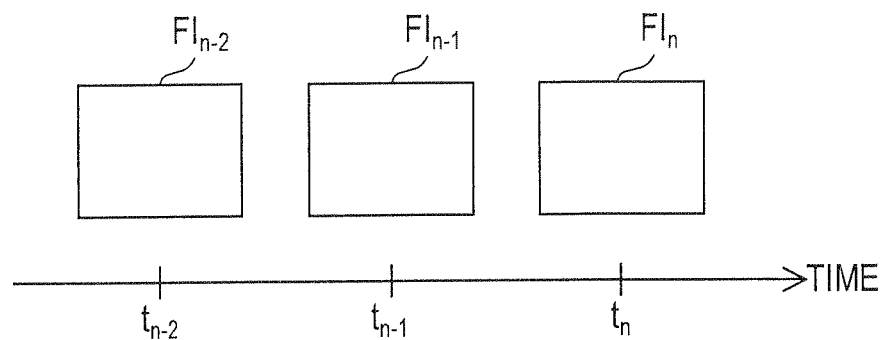
FIG. 8 is a diagram showing a time relationship among three frame images near an image taking time.

Three frame images shown in FIG. 8 that are successively taken in time series, that is, frame images $FI_{n-2}$, $FI_{n-1}$, and $FI_n$ at times $t_{n-2}$, $t_{n-1}$, and $t_n$, respectively, are of interest. It is supposed that the time $t_{n-2}$ is the middle time of an exposure period of the frame image $FI_{n-2}$, the time $t_{n-1}$ is the middle time of an exposure period of the frame image $FI_{n-1}$, and the time $t_n$ is the middle time of an exposure period of the frame image $FI_n$. Besides, for simple description, the length of the exposure period of each frame image is equal to the time length between the times $t_{n-2}$ and $t_{n-1}$ and the time length between the times $t_{n-1}$ and $t_n$. Besides, it is supposed that the frame period is 1/30 sec. and the above sampling period of the angular speed sensor disposed in the motion detection portion 18 is about 1/1000 sec.; and the length of the sampling period is 1/33 the length of the frame period.

Figure 9:
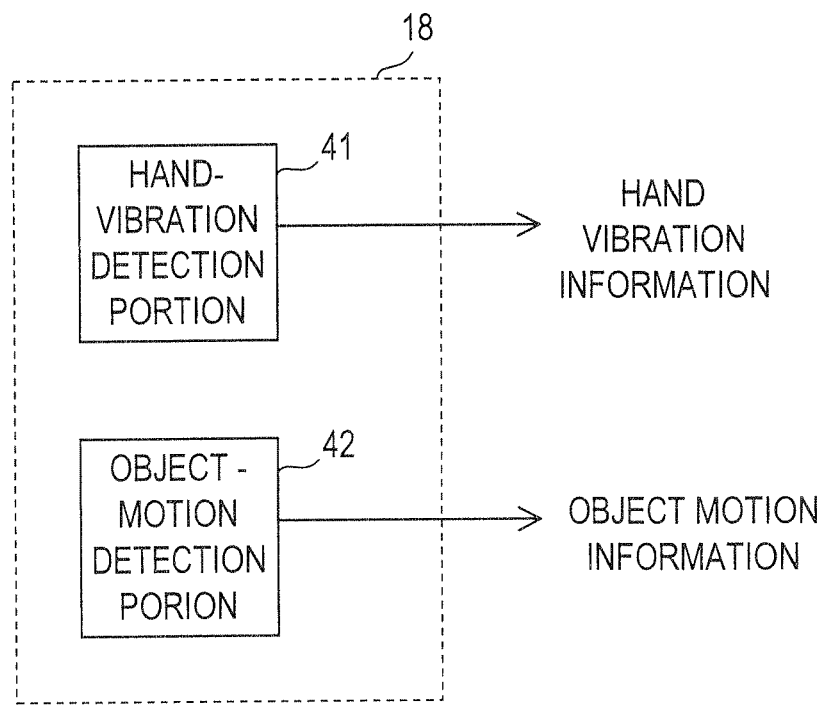
FIG. 9 is an internal block diagram of a motion detection portion according to a second embodiment of the present invention.

Besides, in the second embodiment, as shown in FIG. 9, the motion detection portion 18 is provided with a hand-vibration detection portion 41 that detects a motion (in other words, hand vibration) of the imaging device 1; and an object-motion detection portion 42 that detects a motion of a specific object on an image. The hand-vibration detection portion (device-motion detection portion) 41 is composed of two angular speed sensors as described in the first embodiment and outputs the above hand vibration information. The object-motion detection portion 42, based on the output signal from the imaging portion 11, detects a motion of a specific object on an image and outputs object motion information that represents the detected motion of the specific object. Here, further, it is also possible to provide the hand-vibration detection portion 41 with the angular speed sensor for angular speed measurement in the roll direction described in the first embodiment; in this case, it is also possible to generate the hand vibration information based on measurement results from the three angular speed sensors (also true of a third embodiment). In the following description for both of the present embodiment and the third embodiment, for simple description, only the two angular speed sensors for angular speed measurement in the yaw direction and the pitch direction are of interest.

Both of the hand vibration information and the object motion information are represented as a vector amount on the image taking surface of the imaging element 33 onto which an optical image of a frame image is projected. Accordingly, in the following description, the hand vibration information and the object motion information are called a hand vibration vector and an object motion vector, respectively. Besides, for simple description, it is supposed that the hand vibration direction and the speed are constant during the period of taking the frame images $FI_{n-2}$, $FI_{n-1}$, and $FI_n$. Besides, the coordinates of a point in a frame image of interest are represented by (x, y). The x and y represent a coordinate value in the horizontal direction of the point and a coordinate value in the vertical direction of the point, respectively.

Besides, further, it is supposed that there is one specific object contained in a frame image, and a region other than the specific object region in each frame image is called a background region. It is supposed that an object (in other words, background) in the background region is still on an actual space. A point that is depicted in the background region and still on the actual space is called an "actual still point."

As detailed operation examples of the motion detection portion 18 and the motion-correction control portion 19, first to third operation examples are described below. The content described in each operation example is performed in a time of taking a moving image.

First Operation Example

First, a first operation example is described. Now, a hand vibration vector during the exposure period of the frame image $FI_n$ is represent by $VEC_1$; and an object motion vector during the exposure period of the frame image $FI_n$ is represented by $VEC_2$. Hereinafter, the hand vibration vector $VEC_1$ is briefly represented by the vector $VEC_1$ in some cases (also true of other vectors including the object motion vector $VEC_2$).

Figure 10:
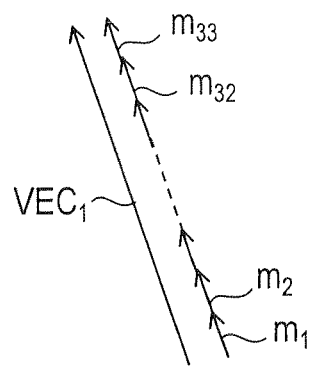
FIG. 10 is a diagram describing a method for obtaining a hand vibration vector by a hand-vibration detection portion shown in FIG. 9.

Based on output signals from the two angular speed sensors, in each sampling period, a movement locus vector at the center of the image taking surface of the imaging element 33 is obtained. It is supposed that this movement locus vector is a locus vector on a plane parallel to the image taking surface at the time the object side is viewed from the imaging device 1 side. Accordingly, for example, if the image taker just in front of the object moves the imaging device 1 in a left and diagonally upper direction, the direction of the above movement locus vector turns into a left and diagonally upper direction. Because the length of the sampling period is ⅓₃ the length of the frame period, 33 movement locus vectors are obtained during the exposure period of one sheet of frame image. As shown in FIG. 10, a combination vector obtained by successively connecting the start points and end points of movement locus vectors $m_1$ to $m_{33}$ during the exposure period of frame image $FI_n$ is the hand vibration vector $VEC_1$. When it is supposed that the correction lens 36 is fixed, the inverse vector of the hand vibration vector $VEC_1$ represents a locus which the image at an actual still point depicts on the image taking surface during the exposure period of the frame image $FI_n$ because of the hand vibration. An inverse vector refers to a vector that has a direction opposite to the direction of the vector of interest. It is supposed that the magnitude of a vector and the magnitude of the inverse vector of the vector are equal to each other.

The object-motion detection portion 42 estimates the object motion vector $VEC_2$ from a comparison of the frame images $FI_{n-2}$ and $FI_{n-1}$. Specifically, on the supposition that the same motion as the motion of the specific object between the frame images $FI_{n-2}$ and $FI_{n-1}$ also occurs during the exposure period of the frame image $FI_n$, the above object motion vector $VEC_2$ is estimated. If there is no estimation error, the object motion vector $VEC_2$ represents a locus which the image of the specific object depicts on the image taking surface during the exposure period of the frame image $FI_n$. Specifically, for example, a displacement vector at the central position of the specific object region between the frame images $FI_{n-2}$ and $FI_{n-1}$ is estimated as the object motion vector $VEC_2$. This displacement vector is obtained by using the frame image $FI_{n-2}$ as a reference. More specifically, in a case where the coordinates of the central positions of the body regions of the specific objects in the frame images $F_{n-2}$ and $FI_{n-1}$ are represented by (x, y) and (x+Δdx, y+Δdy), respectively, a vector that has a horizontal component of Δdx and a vertical component of Δdy is obtained as the object motion vector $VEC_2$.

Figure 11:
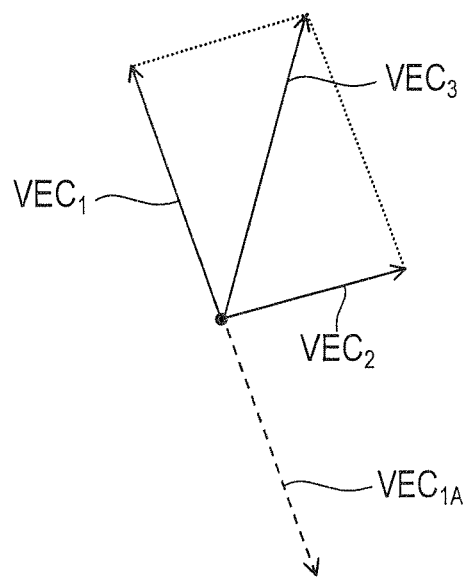
FIG. 11 is a diagram showing a relationship among a hand vibration vector, an object motion vector and a combination vector based on both of the hand vibration vector and the object motion vector in the second embodiment of the present invention.
Figure 12:
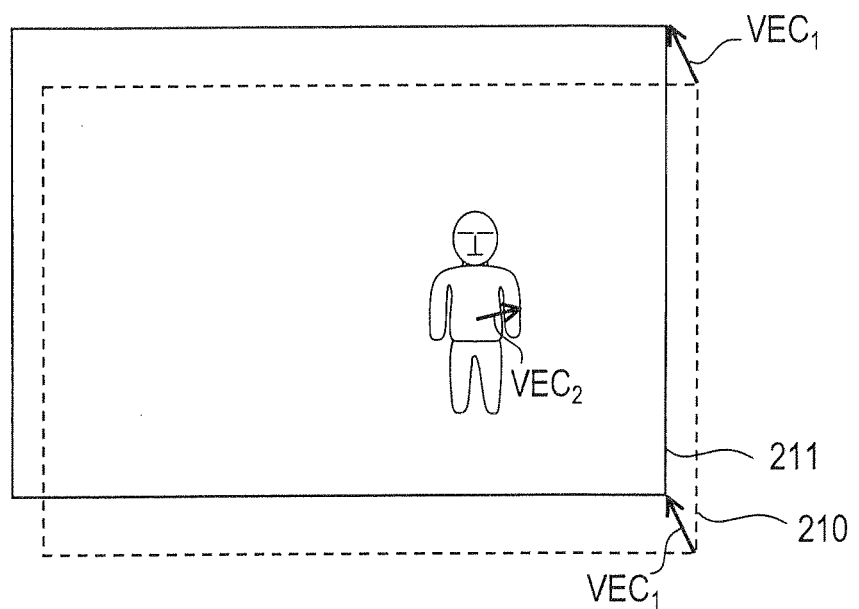
FIG. 12 is a diagram showing a relationship between an image taking region at a start time of light exposure, that is, exposure, of a frame image and an image taking region at an end time of the exposure in the second embodiment of the present invention.

The motion-correction control portion 19 obtains a combination vector $VEC_3$ of the hand vibration vector $VEC_1$ and the object motion vector $VEC_2$. FIG. 11 shows a relationship among the vectors $VEC_1$ to $VEC_3$ on the image taking surface. Besides, the inverse vector of the hand vibration vector $VEC_1$ is represented by $VEC_{1A}$. Besides, in FIG. 12, an image taking region at the exposure start time of the frame image $FI_n$ is represented by a broken-line quadrangular frame 210 and an image taking region at the exposure end time of the frame image $FI_n$ is represented by a solid-line quadrangular frame 211. FIG. 12 also shows the vector $VEC_1$ and the vector $VEC_2$.

If the correction lens 36 is driven to cancel the hand vibration vector $VEC_1$ during the exposure period of the frame image $FI_n$, the image at the actual still point stands still on the image taking surface during the exposure period of the frame image $FI_n$ to form an ideal point image on the frame image $FI_n$. Now, for convenience of description, it is supposed that a vector that represents the movement direction and movement magnitude of the correction lens 36 to cancel the vector $VEC_1$ is represented on the image taking surface where the vectors $VEC_1$ to $VEC_3$ are defined; and the vector matches with the vector $VEC_1$. Accordingly, if the correction lens 36 is moved during the exposure period of the frame image $FI_n$ by the movement direction and movement magnitude that are represented by the vector $VEC_1$, the image at the actual still point forms an ideal point image on the frame image $FI_n$.

In the first operation example, the motion-correction control portion 19 moves the correction lens 36 during the exposure period of the frame image $FI_n$ by the movement direction and movement magnitude that are not represented by the vector $VEC_1$ but represented by the combination vector $VEC_3$. Because the hand vibration vector $VEC_1$ is a vector that is decided at the exposure end time of the frame image FI$_n$, it is impossible to identify the combination vector VEC$_3$ during the exposure period of the frame image FI$_n$. Accordingly, as a matter of fact, every time each of the movement locus vectors (m$_1$ to m$_{33}$; see FIG. 10) that forms the hand vibration vector VEC$_1$ is obtained, a combination vector of each movement locus vector and a vector obtained by equally dividing the vector VEC$_2$ into 33 vectors is obtained; and the correction lens 36 is successively moved during the exposure period of the frame image FI$_n$ by the movement direction and movement magnitude that are represented by the combination vector (in other words, one of the vectors obtained by equally dividing the vector VEC$_3$ into 33 vectors). As a result, finally, between the exposure start time and the exposure end time of the frame image FI$_n$, the correction lens 36 is moved in the movement direction represented by the combination vector VEC$_3$ and by the magnitude of the combination vector VEC$_3$.

Figure 13:
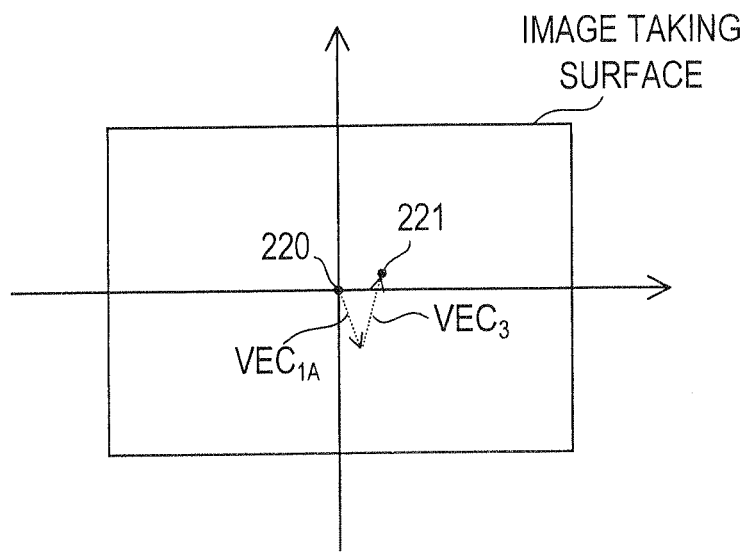
FIG. 13 is a diagram showing how an image at an actual still point on an image taking surface moves between a start time of exposure of a frame image and an end time of the exposure in the second embodiment of the present invention.

By this movement, as shown in FIG. 13, the image of the actual still point that is situated at the center 220 of the image taking surface at the exposure start time of the frame image FI$_n$ moves from the center 220 of the image taking surface by an amount equal to the object motion vector VEC$_2$ to be situated at a point 221 at the exposure end time of the frame image FI$_n$.

The motion-correction control portion 19 controls the clip portion 15 in accordance with the object motion vector VEC$_2$ in such a way that a clip region is set following this movement. As a result, the position of the clip region, which is set in the frame image FI$_n$ by the clip portion 15 based on the specific object information, is shifted in the direction represented by the vector VEC$_2$ and by the magnitude of the vector VEC$_2$. The clip portion 15 extracts an image in the clip region after the shift from the frame image FI$_n$ as a clipped image. By performing such shift control of the clip region, the position change of the actual still point is curbed (ideally, the change disappears) between the clipped image extracted from the frame image FI$_{n-1}$ and the clipped image extracted from the frame image FI$_n$. Specifically, for example, in a case where the actual still point appears at the center of the clipped image extracted from the frame image FI$_{n-1}$, the actual still point is also situated at the center of the clipped image extracted from the frame image FI$_n$.

Vibration in a moving image is roughly divided into vibration in each image that forms a moving image and vibration between images adjacent in time series. The former vibration appears as a blur (hereinafter, called a moving blur) in one sheet of image; and the latter vibration appears as a position change (in other words, a position change of the whole image) of a background between images adjacent in time series. It is possible to reduce the moving blur by drive-controlling the position of the correction lens 36. If the position of the correction lens 36 is drive-controlled based on only the hand vibration vector VEC$_1$, the background stands still in one sheet of frame image and the background blur (moving blur) disappears; however, because the drive control is performed regardless of the motion of the specific object, the blur (moving blur) of the specific object of interest becomes large.

Accordingly, in the first operation example, by drive-controlling the correction lens 36 in accordance with the combination vector VEC$_3$, part of the background blur (moving blur) in the frame image is curbed and part of the blur (moving blur) of the specific object in the frame image is curbed. As a result, it is possible to obtain a frame image and a clipped image in which both of the blurs (moving blur) in the background and the specific object are suitably improved. Besides, by performing the shift control of the clip region based on the object motion vector VEC$_2$, the position change of the background between the clipped images of adjacent frames is curbed. As a result, the position change of the background at the time the sequence of the clipped images is viewed as a moving image is curbed. As described above, the position of the correction lens 36 and the position of the clip region are controlled by using the vectors VEC$_1$ and VEC$_2$, so that the blur (inclusive of the moving blur) in the clipped image is suitably corrected.

Besides, in the above example, the correction lens 36 is drive-controlled in accordance with the combination vector VEC$_3$ that is obtained by combining the hand vibration vector VEC$_1$ and the object motion vector VEC$_2$ at a ratio of 1:1; however, the combination ratio of the vectors VEC$_1$ and VEC$_2$ may not be 1:1. For example, the correction lens 36 may be drive-controlled by using a vector (k$_1$·VEC$_1$+k$_2$·VEC$_2$) that is obtained by combining the vectors VEC$_1$ and the vector VEC$_2$ at a predetermined ratio instead of the combination vector VEC$_3$. Here, k$_1$ is a predetermined value that meets "0<k$_1$□1" and k$_2$ is a predetermined value that meets "0<k$_2$□1." When k$_1$=k$_2$=1, the combination vector (k$_1$·VEC$_1$+k$_2$·VEC$_2$) matches with the combination vector VEC$_3$. The values of k$_1$ and k$_2$ are set in such a way that both of the blurs of the background and the specific object are suitably corrected.

In a case where the correction lens 36 is drive-controlled in accordance with the combination vector VEC$_3$, by performing the shift control of the clip region in accordance with the vector VEC$_2$, the position change of the actual still point disappears between the clipped image extracted from the frame image FI$_{n-1}$ and the clipped image extracted from the frame image FI$_n$. Also, in a case where the correction lens 36 is drive-controlled by using the combination vector (k$_1$·VEC$_1$+k$_2$·VEC$_2$) instead of the combination vector VEC$_3$, the shift control of the clip region may be performed in accordance with a vector based on k$_1$, k$_2$, VEC$_1$ and VEC$_2$ in such a way that the position change of the actual still point disappears between the clipped image extracted from the frame image FI$_{n-1}$ and the clipped image extracted from the frame image FI$_n$.

Besides, without using the angular speed sensors, the hand vibration vector VEC$_1$ may be obtained based on the output signal from the imaging portion 11. In this case, by using the representative point matching method, the block matching method, or the Gradient Method, an optical flow between the whole image of the frame image FI$_{n-2}$ and the whole image of the frame image FI$_{n-1}$ is obtained. This optical flow includes many motion vectors. Of the many motion vectors, the motion vector of the specific object region is neglected and an average vector of the other motion vectors (in other words, motion vectors of the background region) may be obtained as the hand vibration vector VEC$_1$.

Second Operation Example

Next, a second operation example is described. The above first operation example is an operation example that corrects both of the moving blurs of the background and the specific object; however, in the second operation example, the correction target of the moving blur is focused on a specific object to which the image taker pays attention.

In the second operation example as well, the hand vibration vector VEC$_1$ during the exposure period of the frame image FI$_n$ and the object motion vector VEC$_2$ during the exposure period of the frame image FI$_n$ are obtained. The obtaining methods for the vectors VEC$_1$ and VEC$_2$ are the same as those described in the first operation example. However, the motion-correction control portion 19 moves the correction lens 36 in the movement direction and by the movement magnitude represented by the vector $VEC_2$ during the exposure period of the frame image $FI_n$, thereby curbing the position change of the image of the specific object on the imaging element 33 during the exposure period of the frame image $FI_n$. Ideally, the position change disappears and the moving blur of the specific object in the frame image $FI_n$ disappears.

Figure 14:
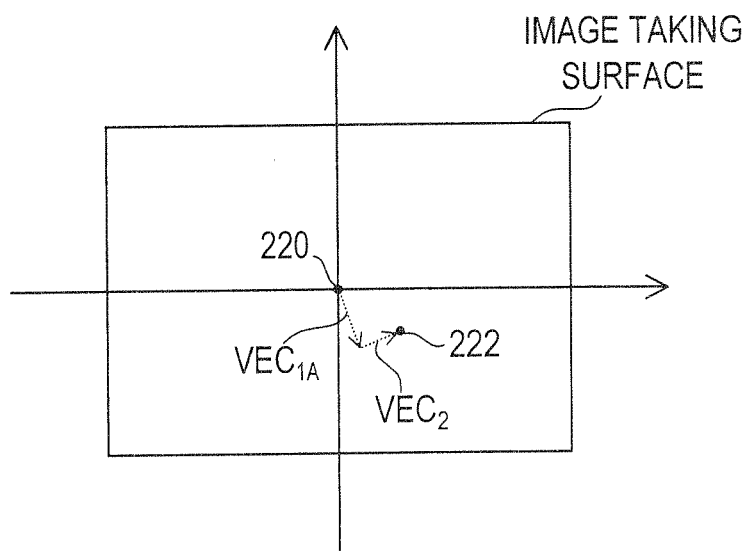
FIG. 14 is a diagram showing how an image at an actual still point on an image taking surface moves between a start time of exposure of a frame image and an end time of the exposure in the second embodiment of the present invention.

On the other hand, by this movement of the correction lens 36, as shown in FIG. 14, the image of the actual still point that is situated at the center 220 of the image taking surface at the exposure start time of the frame image $FI_n$ moves from the center 220 by an amount equal to a combination vector $(VEC_{1A}+VEC_2)$ of the inverse vector of the hand vibration vector $VEC_1$ and the object motion vector $VEC_2$ to be situated at a point 222 at the exposure end time of the frame image $FI_n$.

The motion-correction control portion 19 controls the clip portion 15 in accordance with the combination vector $(VEC_{1A}+VEC_2)$ in such a way that a clip region is set following this movement. As a result, the position of the clip region, which is set in the frame image $FI_n$ by the clip portion 15 based on the specific object information, is shifted in the direction represented by the combination vector $(VEC_{1A}+VEC_2)$ and by the magnitude of the combination vector $(VEC_{1A}+VEC_2)$. The clip portion 15 extracts an image in the clip region after the shift from the frame image $FI_n$ as a clipped image. By performing such shift control of the clip region, the position change of the actual still point is curbed (ideally, the change disappears) between the clipped image extracted from the frame image $FI_{n-1}$ and the clipped image extracted from the frame image $FI_n$.

As described above, in the second operation example, by drive-controlling the correction lens 36 in accordance with the object motion vector $VEC_2$, the position change of the image of the specific object on the imaging element 33 during the exposure period of the frame image is curbed. As a result, the occurrences of the vibrations (moving blurs) of the specific objects in the frame image and the clipped image are curbed. Besides, by the shift control of the clip region based on the combination vector $(VEC_{1A}+VEC_2)$, the position change of the background between the clipped images of adjacent frames is curbed. In other words, the position change of the background at the time the sequence of clipped images is viewed as a moving image is curbed. As described above, the position of the correction lens 36 and the position of the clip region are controlled by using the vectors $VEC_1$ and $VEC_2$, so that the vibration (inclusive of the moving blur) in the clipped image is suitably corrected.

Third Operation Example

Next, a third operation example is described. In a case where the imaging device 1 is completely fixed, while a specific object moves on an actual space, an object motion vector depending on the movement is successively obtained, and for example, the position of a clip region is set based on the object motion vector in such a way that the specific object is always situated at the center of a clipped image On the other hand, if the imaging device 1 is completely fixed and the specific object is completely still on the actual space, ideally, the position of the specific object region stands still in a moving image that consists of a sequence of frame images. Accordingly, the position of a clip region set in each frame image is constant.

However, even if the person as the specific object is completely still, in the interest of accuracy of the tracking process, it can be thought that the position (the center or the position of the gravity center) of the detected specific object region does not stand still completely in the moving image that consists of the sequence of frame images. Besides, even if the specific object tries to stand still, actually there are many cases where part of the body of the person as the specific object vibrates. The magnitude of the motion of the specific object that is detected because of these is small; however, if the position of the clip region is controlled following such motion, a moving image of a sequence of clipped images, which unsteadily vibrates and is unstable, is obtained.

Accordingly, in the third operation example, in a case where the magnitude of the object motion vector is smaller than a predetermined reference magnitude, the position of the clip region is fixed. In a case where the frame images $FI_{n-1}$ and $FI_n$ are of interest (see FIG. 8), specifically, the following process is performed. Here, it is supposed that the size of the clip region is the same between the frame images $FI_{n-1}$ and $FI_n$.

The object-motion detection portion 42 in FIG. 9 detects, from the comparison of the frame images $FI_{n-1}$ and $FI_n$, a motion (motion on the image taking surface) of the specific object between the times $t_{n-1}$ and $t_n$; and obtains an object motion vector $VEC_A$ that represents the motion. For example, a displacement vector at the central position of the specific object region between the frame images $FI_{n-1}$ and $FI_n$ is estimated as the object motion vector $VEC_A$. This displacement vector is obtained by using the frame image $FI_{n-1}$ as a reference. More specifically, in a case where the coordinates of the central positions of the body regions of the specific objects in the frame images $FI_{n-1}$ and $FI_n$ are represented by $(x, y)$ and $(x+\Delta dx, y+\Delta dy)$, respectively, a vector that has a horizontal component of $\Delta dx$ and a vertical component of $\Delta dy$ is obtained as the object motion vector $VEC_A$.

The motion-correction control portion 19 in FIG. 1 compares the magnitude of the object motion vector $VEC_A$ with the predetermined reference magnitude; and if the former is smaller than the latter, controls the clip portion 15 in such a way that the set position of the clip region is fixed between the frame images $FI_{n-1}$ and $FI_n$. In this way, the position of the clip region that is set in the frame image $FI_n$ becomes the same as the position of the clip region that is set in the frame image $FI_{n-1}$.

On the other hand, if the magnitude of the object motion vector $VEC_A$ is larger than the reference magnitude, the usual tracking process is performed. In other words, from the position of the clip region that is set in the frame image $FI_{n-1}$, the position of the clip region that is set in the frame image $FI_n$ is shifted in the direction represented by the vector $VEC_A$ by the magnitude of the vector $VEC_A$.

According to such process, a moving image of a sequence of clipped images, which does not unsteadily vibrate and is stable, is obtained.

Here, the method described in the third operation example is also applicable to the above first and second operation examples. In a case where the method is applied to the first or second operation example, the motion-correction control portion 19 compares the magnitude of the object motion vector $VEC_A$ and the reference magnitude. And, if the former is larger than the latter, as described in the first or second operation example, the motion-correction control portion 19 controls the clip portion 15 in such a way that the position of the clip region is shifted between the frame images $FI_{n-1}$ and $FI_n$; if the former is smaller than the latter, the motion-correction control portion 19 controls the clip portion 15 in such a way that the set position of the clip region is fixed between the frame images $FI_{n-1}$ and $FI_n$.

Third Embodiment

Next, a third embodiment of the present invention is described. In the above first and second embodiments, the vibration correction that uses the correction lens 36 is performed; however, in the third embodiment, it is supposed that the there is not the correction lens 36. The third embodiment corresponds to an embodiment obtained by modifying part of the first embodiment. The technology described in the third embodiment is combined with the first embodiment and put into practice; and the items described in the first and second embodiments are also applied to the third embodiment as long as there is no discrepancy. A structural block diagram of an imaging device according to the third embodiment is the same as that of the imaging device 1 in FIG. 1. Hereinafter, the third embodiment is described focusing on points different from the first embodiment.

The imaging element is disposed in the imaging portion 11; and the imaging element in the third embodiment is especially called an imaging element 33a. The imaging element 33a is disposed instead of the imaging element 33 in FIG. 2; and the basic function of the imaging element 33a is the same as that of the imaging element 33.

Figure 15:
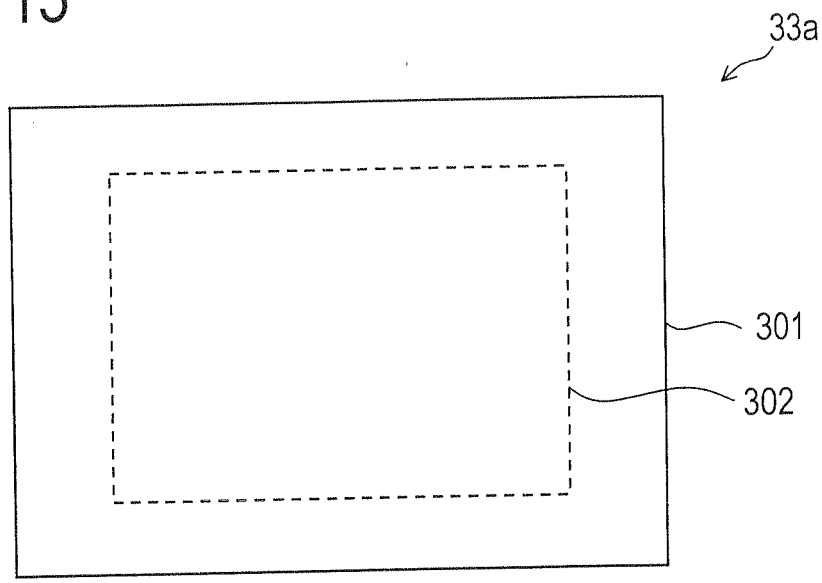
FIG. 15 is a diagram showing a structure of an imaging element according to a third embodiment of the present invention.

A structure of the imaging element 33a is described with reference to FIG. 15. An imagable pixel region where a plurality of light receiving pixels are arranged two dimensionally is disposed on an image taking surface of the imaging element 33a; and a partial region of the imagable pixel region is used as an effective pixel region. In FIG. 15, a region in a solid-line quadrangular frame 301 is the imagable pixel region; and a region in a broken-line quadrangular frame 302 is the effective pixel region.

A frame image is represented by an output signal from each of the light receiving pixels arranged in the effective image taking region (effective pixel region); and accumulated electric charges of each of the light receiving pixels that are arranged outside the effective image taking region are not related to the frame image. The motion-correction control portion 19 in FIG. 1, based on the hand vibration information given from the motion detection portion 18, controls the position of the effective image taking region in the imagable pixel region. In this way, it is also possible to achieve a well-known electronic hand vibration correction; however, in the present embodiment, considering the motion of the specific object as well, the vibration of a clipped image is suitably corrected. However, it is natural that the vibration to be corrected in the present embodiment does not include the moving blur described in the second embodiment.

As described in the second embodiment, the motion detection portion 18 is provided with the hand-vibration detection portion 41 that detects the motion (in other words, hand vibration) of the imaging device 1; and the object-motion detection portion 42 that detects the motion of a specific object on an image (see FIG. 9). The hand-vibration detection portion 41 is composed of the two angular speed sensors as described in the first embodiment and outputs the above hand vibration information. The object-motion detection portion 42, based on the output signal (output signal from the imaging element 33a in the present embodiment) from the imaging portion 11, detects the motion of the specific object on the image and outputs the object motion information that represents the detected motion of the specific object.

Both of the hand vibration information and the object motion information are represented as a vector amount on the image taking surface of the imaging element 33a onto which an optical image of a frame image is projected. Accordingly, like the second embodiment, the hand vibration information and the object motion information are called the hand vibration vector and the object motion vector, respectively. Besides, for simple description, it is supposed that the hand vibration direction and the speed are constant during the time of taking the frame images $FI_{n-2}$, $FI_{n-1}$, and $FI_n$.

Operations of the motion detection portion 18 and the motion-correction control portion 19 in the third embodiment are described focusing on the frame images $FI_{n-2}$, $FI_{n-1}$ and $FI_n$ at the times $t_{n-2}$, $t_{n-1}$ and $t_n$ shown in FIG. 8.

Now, a hand vibration vector between the times $t_{n-1}$ and $t_n$ is represented by $VEC_{11}$ and an object motion vector, between the times $t_{n-1}$ and $t_n$ is represented by $VEC_{12}$.

Based on output signals from the two angular speed sensors, in each sampling period, a movement locus vector at the center of the image taking surface of the imaging element 33a is obtained. As described in the second embodiment, it is supposed that this movement locus vector is a locus vector on a plane parallel to the image taking surface at the time the object side is viewed from the imaging device 1 side. As described in the second embodiment (see FIG. 10), a combination vector obtained by successively connecting all movement locus vectors obtained between the times $t_{n-1}$ and $t_n$ is the hand vibration vector $VEC_{11}$. The inverse vector $VEC_{11A}$ of the hand vibration vector $VEC_{11}$ represents a locus which the image at an actual still point depicts on the image taking surface between the times $t_{n-1}$ and $t_n$ because of the hand vibration.

The motion-correction control portion 19, based on the vectors $VEC_{11}$ and $VEC_{12}$, controls the position of the effective image taking region for the frame image $FI_n$. Accordingly, it is impossible to obtain the vector $VEC_{12}$ by using the frame image $FI_n$. Accordingly, the vector $VEC_{12}$ is estimated from the two frame images that are obtained immediately before the frame image $FI_n$. Specifically, for example, a displacement vector of the central position of the specific object region between the frame images $FI_{n-2}$ and $FI_{n-1}$ is estimated as the object motion vector $VEC_{12}$. This displacement vector is obtained by using the frame image $FI_{n-2}$ as a reference. More specifically, in a case where the coordinates of the central positions of the body regions of the specific objects in the frame images $FI_{n-2}$ and $FI_{n-1}$ are represented by (x, y) and (x+Δdx, y+Δdy), respectively, a vector that has a horizontal component of Δdx and a vertical component of Δdy is obtained as the object motion vector $VEC_{12}$.

Figure 16:
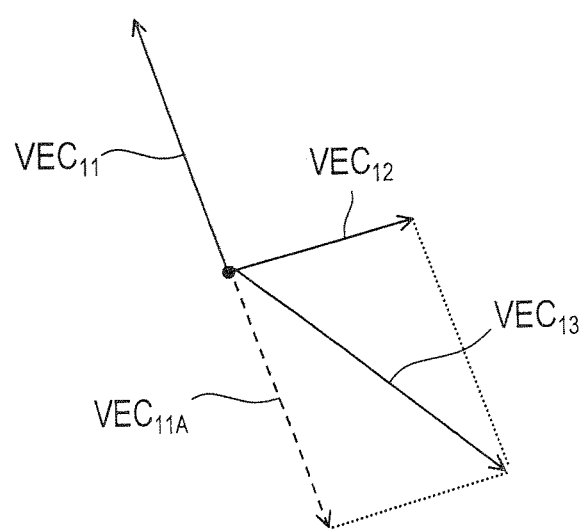
FIG. 16 is a diagram showing a relationship among a hand vibration vector, an object motion vector and a combination vector based on both of the hand vibration vector and the object motion vector in the third embodiment of the present invention.

The motion-correction control portion 19 obtains a combination vector $VEC_{13}$ of the inverse vector $VEC_{11A}$ of the hand vibration vector $VEC_{11}$ and the object motion vector $VEC_{12}$. FIG. 16 shows a relationship among the vectors $VEC_{11}$, $VEC_{11A}$, $VEC_{12}$ and $VEC_{13}$ on the image taking surface.

If, as shown in FIG. 17 (a), by using the position of the effective image taking region at the time of obtaining the frame image $FI_{n-1}$ as a reference, the position of the effective image taking region at the time of obtaining the frame image $FI_n$ is moved in the direction of the inverse vector $VEC_{11A}$ and by the magnitude of the inverse vector $VEC_{11A}$, a general electronic hand vibration correction is achieved. In other words, the position change of the actual still point is curbed (ideally, the change disappears) between the frame images $FI_{n-1}$ and $FI_n$. However, here, as shown in FIG. 17 (b), by using the position of the effective image taking region at the time of obtaining the frame image $FI_{n-1}$ as the reference, the position of the effective image taking region at the time of obtaining the frame image $FI_n$ is moved in the direction of the combination vector $VEC_{13}$ and by the magnitude of the combination vector $VEC_{13}$.

Figure 18:
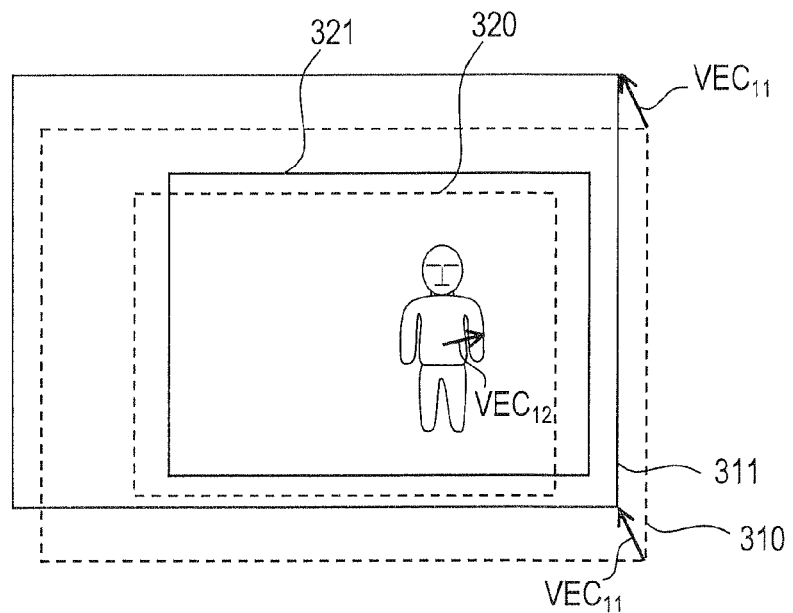
FIG. 18 is a diagram showing, together with an optical image projected onto the imaging element, a position relationship between an imagable pixel region and an effective pixel region at a time $t_{n-1}$ and an imagable pixel region and an effective pixel region at a time $t_n$ in the third embodiment of the present invention.

FIG. 18 shows a position relationship among the imagable pixel region and the effective pixel region at the time $t_{n-1}$ and the imagable pixel region and the effective pixel region at the time $t_n$ together with an optical image projected onto the imaging element 33a. Besides, FIG. 18 also shows the vectors $VEC_{11}$ and $VEC_{12}$. In FIG. 18, a region in a broken-line quadrangular frame 310 and a region in a solid-line quadrangular frame 311 represent the imagable pixel regions at the times $t_{n-1}$ and $t_n$, respectively; and a region in a broken-line quadrangular frame 320 and a region in a solid-line quadrangular frame 321 represent the effective pixel regions at the times $t_{n-1}$ and $t_n$, respectively If the optical image of the specific object extends beyond the effective pixel region, it becomes impossible to perform the tracking for the specific object. Accordingly, as described above, the position of the effective pixel region is set in the right in accordance with the combination vector $VEC_{13}$ that considers the specific motion vector $VEC_{12}$. As a result, the possibility that the specific object frames out is curbed and the deformation of the composition focusing on the specific object is also curbed.

Figure 19:
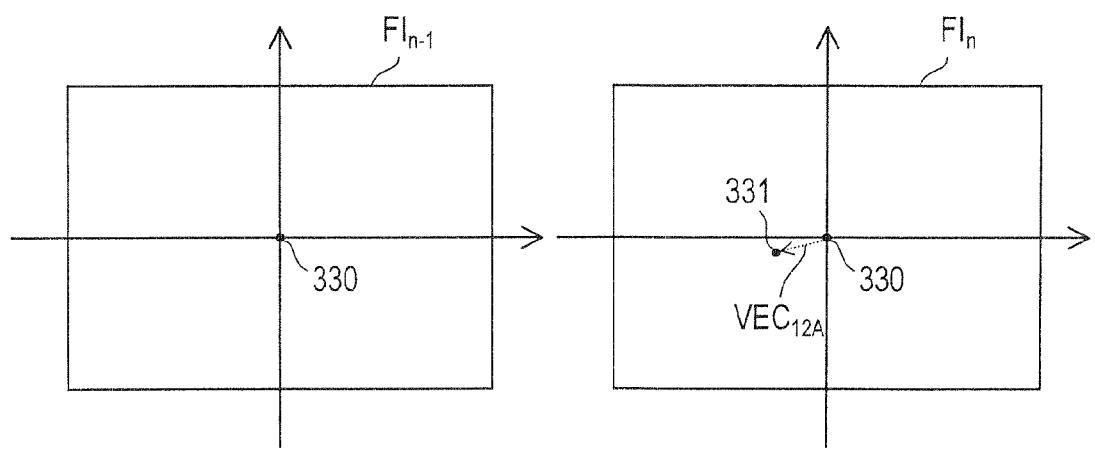
FIG. 19 is a diagram showing how a position of an image at an actual still point moves between adjacent frame images in the third embodiment of the present invention.

However, by the position control of the effective pixel region, as shown in FIG. 19, the image of the actual still point situated at the center 330 of the frame image $FI_{n-1}$ is moved from the center 330 by an amount equal to the inverse vector $VEC_{12A}$ of the object motion vector $VEC_{12}$ to be situated at the point 331 in the frame image $FI_n$.

The motion-correction control portion 19 controls the clip portion 15 in accordance with the inverse vector $VEC_{12A}$ in such a way that a clip region is set following this movement. As a result, the position of the clip region, which is set in the frame image $FI_n$ by the clip portion 15 based on the specific object information, is shifted in the direction represented by the inverse vector $VEC_{12A}$ and by the magnitude of the inverse vector $VEC_{12A}$. The clip portion 15 extracts an image in the clip region after the shift from the frame image $FI_n$ as a clipped image. By performing such shift control of the clip region, the position change of the actual still point is curbed (ideally, the change disappears) between the clipped image extracted from the frame image $FI_{n-1}$ and the clipped image extracted from the frame image $FI_n$.

As described above, by controlling the position of the effective pixel region and the position of clip region by using the vectors $VEC_1$ and $VEC_2$, the possibility that the specific object frames out is curbed and the position change of the background at the time the sequence of the clipped image is viewed as a moving image is curbed. In other words, the possibility that the specific object frames out is curbed and the vibration (exclusive of the moving blur) in the clipped image is suitably corrected.

Besides, in the above example, the position of the effective pixel region is set in accordance with the combination vector $VEC_{13}$ that is obtained by combining the inverse vector $VEC_{11A}$ of the hand vibration vector $VEC_{11}$ and the object motion vector $VEC_{12}$ at a ratio of 1:1; however, the combination ratio of the vectors $VEC_{11A}$ and $VEC_{12}$ may not be 1:1. For example, the position of the effective pixel region may be set by using a vector $(k_{11} \cdot VEC_{11A} + k_{12} \cdot VEC_{12})$ that is obtained by combining the vectors $VEC_{11A}$ and the vector $VEC_{12}$ at a predetermined ratio instead of the combination vector $VEC_{13}$. Here, $k_{11}$ is a predetermined value that meets "0<$k_{11}$□1" and $k_{12}$ is a predetermined value that meets "0<$k_{12}$□1." When $k_{11}=k_{12}=1$, the combination vector $(k_{11} \cdot VEC_{11A} + k_{12} \cdot VEC_{12})$ matches with the combination vector $VEC_{13}$. It is desirable that the value $k_{11}$ is as close to 1 as possible to remove the vibration between adjacent frame images, while it is desirable that the value $k_{12}$ is as close to 1 as possible to avoid the framing out of the specific object.

In a case where the position of the effective pixel region is set in accordance with the combination vector $VEC_{13}$, by performing the shift control of the clip region in accordance with the inverse vector $VEC_{12A}$, the position change of the actual still point disappears between the clipped image extracted from the frame image $FI_{n-1}$ and the clipped image extracted from the frame image $FI_n$. Also, in a case where the position of the effective pixel region is set by using the combination vector $(k_{11} \cdot VEC_{11A} + k_{12} \cdot VEC_{12})$ instead of the combination vector $VEC_{13}$, the shift control of the clip region may be performed in accordance with a vector based on $k_{11}$, $k_{12}$, $VEC_{11A}$ and $VEC_{12A}$ in such a way that the position change of the actual still point disappears between the clipped image extracted from the frame image $FI_{n-1}$ and the clipped image extracted from the frame image $FI_n$.

Besides, without using the angular speed sensors, the hand vibration vector $VEC_{11}$ may be obtained based on the output signal from the imaging portion 11. In this case, by using the representative point matching method, the block matching method, or the Gradient Method, an optical flow between the whole image of the frame image $FI_{n-2}$ and the whole image of the frame image $FI_{n-1}$ is obtained. This optical flow includes many motion vectors. Of the many motion vectors, the motion vector of the specific object region is neglected and an average vector of the other motion vectors (in other words, motion vectors of the background region) may be obtained as the hand vibration vector $VEC_{11}$.

Besides, the method described in the third operation example of the second embodiment is also applicable to the present embodiment. In this case, for example, the motion-correction control portion 19 compares the magnitude of the object motion vector $VEC_{12}$ with a predetermined reference magnitude. And, if the former is larger than the latter, as described above, the motion-correction control portion 19 controls the clip portion 15 in such a way that the position of the clip region is shifted between the frame images $FI_{n-1}$ and $FI_n$; if the former is smaller than the latter, the motion-correction control portion 19 controls the clip portion 15 in such a way that the set position of the clip region is fixed between the frame images $FI_{n-1}$ and $FI_n$.

Modifications and the Like

The specific numerical values shown in the above description are only examples, and of course, it is possible to change them to various numerical values. As modifications or noted items of the above embodiments, annotations 1 to 6 are described hereinafter. It is possible to arbitrarily combine the contents described in each notification as long as there is no discrepancy.

[Annotation 1]

In the second embodiment, a technique for the vibration correction by means of the drive control of the optical lens 36 and the position control of the clip region is described; however, it is desirable that the imaging device 1 is composed to allow execution and non-execution of this vibration correction to be selected. For example, in the second embodiment, when the predetermined operation is performed on the operation portion 17 in FIG. 1, the position of the optical lens 36 is fixed and the position control (the above shift control) of the clip region by the motion-correction control portion 19 is prohibited.

Likewise, it is desirable that execution and non-execution on the vibration correction in the third embodiment are selectable. For example, in the third embodiment, when the predetermined operation is performed on the operation portion 17 in FIG. 1, the position of the effective image taking region is fixed and the position control (the above shift control) of the clip region by the motion-correction control portion 19 is prohibited.

[Annotation 2]

The specific object to be detected from the frame image may be a thing other than a person. For example, an automobile, a robot or the like may be used as the specific object. Based on unique image features (edge feature and color feature) that the specific object has, the specific-object detection portion 14 performs the initial detection of the specific object from the frame image and performs the tracking process for the specific object in a sequence of the frame images.

[Annotation 3]

In the first and second embodiments, the correction lens 36 is used as the optical member to move the optical image of the object (image taking target) on the image taking surface; however, instead of the correction lens 36, a Vari-Angle Prism (not shown) may be used. The Vari-Angle Prism has a structure in which a liquid having a high refractive index is injected between two glass plates; by tilting one or both of the glass plates, it is possible to change the refraction direction of light that enters the Vari-Angle Prism itself. Light from the object enters the imaging element 33 via an optical system that includes the Vari-Angle Prism. Instead of drive-controlling the position of the correction lens 36, by drive-controlling the tilt of the glass plate in the Vari-Angle Prism, it is possible to achieve the same processes as those described in the first and second embodiments.

Besides, the function to move the optical image of the object (image taking target) on the imaging element may be achieved by a movement in a two-dimensional direction (two-dimensional direction that meets with the optical axis at right angles) of the imaging element 33. The two-dimensional movement of the imaging element 33 is achieved by a not-shown actuator, for example; and the motion-correction control portion 19 controls the actuator based on the information from the motion detection portion 18. Instead of drive-controlling the position of the correction lens 36, by drive-controlling the position of the imaging element 33, it is possible to achieve the same processes as those described in the first and second embodiments.

[Annotation 4]

The example in which the hand-vibration detection portion 41 in FIG. 9 is composed of an angular speed sensor that detects an angular speed is described above; however, the hand-vibration detection portion 41 may be composed of a sensor that detects another physical amount which represents the motion of the imaging device 1. For example, the hand-vibration detection portion 41 may be composed of an acceleration sensor that detects an acceleration of the imaging device 1 or an angular acceleration sensor that detects an angular acceleration of the imaging device 1. It is possible to obtain the above hand vibration vector from an output signal from the acceleration sensor or the angular acceleration sensor that represents the acceleration or the angular acceleration of the imaging device 1.

[Annotation 5]

It is possible to achieve the imaging device 1 in FIG. 1 with hardware, or a combination of hardware and software. Especially, it is possible to achieve the image process based on the image data that is performed in the imaging device 1 with hardware, software, or a combination of hardware and software. In a case where the imaging device 1 is composed by using software, a block diagram of each portion achieved by the software shows a functional block diagram of the portion.

Besides, all or part of the operation processes necessary to obtain the clipped image after the improvement of the resolution from the frame image are written as a program and the program is executed on a program execution apparatus (e.g., a computer), so that all or part of the operation processes may be achieved.

[Annotation 6]

For example, it is possible to think as follows. The correction lens 36 or the above Vari-Angle Prism (not shown) functions as an image moving portion that moves an optical image projected onto the imaging element 33 on the imaging element 33. It may be thought that the image moving means includes the driver 34 that drives the correction lens 36 or a driver (not shown) that drives the Vari-Angle Prism. Besides, in a case where the optical image projected onto the imaging element 33 is moved on the imaging element 33 by moving the imaging element 33 as described above, the actuator (not shown) that drives the imaging element 33 functions as the image moving means.

Beside, in a time of reproducing a moving image, the portion that includes the specific-object detection portion 14, the clip portion 15 and the image-quality compensation portion 16 shown in FIG. 1 functions as an image reproduction device. It may be thought that this image reproduction device includes the other portions (image obtaining portion 13 and display portion 21) that constitute the imaging device 1. This image reproduction device may be achieved with an external device outside the imaging device 1 that is able to read the recorded data from the recording medium 22.

The invention claimed is:

1. An imaging device for correcting images comprising:
   an imaging element that by taking an image, outputs a signal which represents an optical image of an image taking target;
   a specific-object detection portion that successively obtains an input image based on an output signal from the imaging element and detects, based on an image signal of the input image, a position of a specific object contained in the image taking target on the input image;
   a clipped-image extraction portion that based on the detected position, sets a clip region in the input image and extracts a clipped image in the clip region, wherein the clip region is smaller than a whole region of the input image;
   an image-quality compensation portion that improves resolution of the clipped image;
   a device-motion detection portion that detects a motion of the imaging device;
   an object-motion detection portion that based on the output signal from the imaging element, detects a motion of the specific object between input images of adjacent frames; and
   a correction portion that corrects vibration of the clipped image based on a detection result from the device-motion detection portion and a detection result from the object-motion detection portion.

2. The imaging device according to claim 1,
   wherein the correction portion refers to
      a first vector that corresponds to the motion of the imaging device detected by the device-motion detection portion and to
      a second vector that corresponds to the motion of the specific object detected by the object-motion detection portion.

3. The imaging device according to claim 1, further comprising:
   an image moving portion that moves the optical image on the imaging element;

wherein the correction portion, based on the detection result from the device-motion detection portion and the detection result from the object-motion detection portion, controls a movement by the image moving portion and a position of the clipped image that is set by the clipped-image extraction portion, thereby correcting the vibration of the clipped image.

4. The imaging device according to claim 3, wherein the correction portion controls the image moving portion in accordance with a vector obtained by combining a first and second vectors at a predetermined ratio, and the correction portion further controls the clipped-image extraction portion in such a way that a position change of a still object contained in the image taking target between clipped images of the adjacent frames is decreased.

5. The imaging device according to claim 3, wherein the correction portion controls the image moving portion based on a second vector in such a way that a position change of an image of the specific object on the imaging element is decreased, and the correction portion further controls the clipped-image extraction portion in such a way that a position change of a still object contained in the image taking target between clipped images of the adjacent frames is decreased.

6. The imaging device according to claim 1, wherein a plurality of light receiving pixels are arranged in a first region of an image taking surface of the imaging element;

a second region smaller than the first region is set in the first region of the imaging element, and the input image is formed based on an output signal from a group of light receiving pixels that are disposed in the second region; and based on the detection result from the device-motion detection portion and the detection result from the object-motion detection portion, the correction portion controls a set position of the second region and a position of the clip region that is set by the clipped-image extraction portion, thereby correcting the vibration of the clipped image.

7. The imaging device according to claim 6, wherein the correction portion controls the set position of the second region in accordance with a vector obtained by combining a first and second vectors at a predetermined ratio, and the correction portion further controls the clipped-image extraction portion in such a way that a position change of a still object contained in the image taking target between clipped images of the adjacent frames is decreased.

8. The imaging device according to claim 1, wherein the correction portion refers to a vector that depends on the motion of the specific object which is based on the detection result from the object-motion detection portion; and in a case where a magnitude of the vector is smaller than a predetermined magnitude, controls the clipped-image extraction portion in such a way that a position of the clip region is fixed between the adjacent frames.

9. The imaging device according to claim 1, wherein by means of a super-resolution process that uses clipped images for a plurality of frames, the image-quality compensation portion improves resolution of a clipped image of a frame of interest that is contained in the clipped images for the plurality of frames.

10. The imaging device according to claim 1, further comprising a recording control portion that records an image signal of the clipped image before or after the improvement of the resolution into a recording portion.

11. The imaging device according to claim 1, wherein an image signal of the clipped image whose resolution is improved is output to a display portion.

12. An image reproduction device for correcting images comprising:

a specific-object detection portion that by reading an image signal obtained by successively taking an image of an image taking target from a recoding portion, obtains successively an input image based on the image signal, and detects, based on an image signal of the input image, a position of a specific object contained in the image taking target on the input image;

a clipped-image extraction portion that based on the detected position, sets a clip region in the input image and extracts a clipped image in the clipped region, wherein the clip region is smaller than a whole region of the input image; and an image-quality compensation portion that improves resolution of the clipped image; wherein an image signal of the clipped image whose resolution is improved is output to a display portion or to outside, the image reproduction device further comprises:

a device-motion detection portion that detects a motion of a imaging device which takes an image of the image taking target;

an object-motion detection portion that detects a motion of the specific object between input images of adjacent frames based on the image signal; and a correction portion that corrects vibration of the clipped image based on a detection result from the device-motion detection portion and a detection result from the object-motion detection portion.

13. The image reproduction device according to claim 12, wherein the correction portion refers to a first vector that corresponds to the motion of the imaging device detected by the device-motion detection portion and to a second vector that corresponds to the motion of the specific object detected by the object-motion detection portion.

* * * * *